United States Patent
Obara

(10) Patent No.: US 6,754,153 B2
(45) Date of Patent: Jun. 22, 2004

(54) EXPOSURE APPARATUS FOR OPTICAL DISC

(75) Inventor: Takashi Obara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 342 days.

(21) Appl. No.: 09/902,242

(22) Filed: Jul. 10, 2001

(65) Prior Publication Data

US 2002/0041549 A1 Apr. 11, 2002

(30) Foreign Application Priority Data

Jul. 11, 2000 (JP) .......................................... 2000-209777
Sep. 11, 2000 (JP) .......................................... 2000-275604

(51) Int. Cl.$^7$ .................................................. G11B 7/00
(52) U.S. Cl. ................................ 369/53.18; 369/47.44; 369/44.32; 369/53.42
(58) Field of Search ............................. 369/44.32, 47.4, 369/47.44, 47.38, 53.18, 53.12, 53.33, 53.42, 247

(56) References Cited

U.S. PATENT DOCUMENTS 5,805,540 A * 9/1998 Kitai et al. ............... 369/53.29
5,825,730 A   10/1998 Nishida et al. .......... 369/44.32

FOREIGN PATENT DOCUMENTS

| EP | 0244005 A1 | 11/1987 |
| JP | 8329476 | 12/1996 |
| JP | 9190651 | 7/1997 |
| JP | 10261245 | 9/1998 |
| JP | 10293928 | 11/1998 |
| TW | 385438 | 3/2000 |

* cited by examiner

*Primary Examiner*—Doris H. To
*Assistant Examiner*—Jorge L Ortiz Criado
(74) *Attorney, Agent, or Firm*—Cooper & Dunham LLP

(57) ABSTRACT

An exposure apparatus for an optical disc used for eliminating the vibrations in the propagating direction when a rotation mechanism rotates. The slider controller 40 and the spindle controller 41 of the exposure apparatus 1 are activated, and the then the optical disc begins to be rotated by an AC synchronized motor. Through a condensing device 9, laser beams emitted form the laser source 6 are irradiated on the optical disc for exposure. At this time, the optical disc is eccentrically chucked on the rotation mechanism, resulting a rotational vibration of the whole rotation mechanism. A measurer 17 is used for detecting a propagating component of the rotational vibration, and a vibrator controller 42 controls the vibrator 20 as the output of the measurer 17 approaches zero. Therefore, the vibration in the propagating direction of the base 2 is cancelled, and the propagation accuracy is increased and the exposure quality is enhanced.

24 Claims, 15 Drawing Sheets

EXPOSURE APPARATUS FOR OPTICAL DISC

CROSS-REFERENCE TO RELATED APPLICATION

This application claims the priority benefit of Japanese application serial no. 2000-209777, filed on Jul. 11, 2000, and 2000-275604, filed on Sep. 11, 2000.

BACKGROUND OF THE INVENTION

1. Field of the Invention

The present invention is related to an exposure apparatus for an optical disc. More particular, the present invention is related to an exposure apparatus having vibration means capable of vibrating to eliminate vibrations along the propagating direction as a rotation mechanism rotates, thereby pitches between two adjacent tracks on the optical disc can be exposed with a high precision. In addition, the present invention is related to an the exposure apparatus that a three-dimensional shape measuring device can be used for its propagation device.

2. Description of the Prior Art

Nowadays, information or data can be reproduced optically, and an optical disc is well developed for reproducing data from or recording data into the optical disc in an optical manner. The optical disc, for example, can be a compact disc (CD), a compact disc-read only memory (CD-ROM), a compact disc recordable (CD-R), or compact disc rewritable (CD-RW), etc.

In general, an exposure to the optical disc can be done by an exposure apparatus disclosed by Japanese Laid Open 10-293928, for example. The exposure apparatus includes a head fixed on the exposure apparatus through a tiny sliding device for emitting optical beams, and a sliding stage on which a turntable for supporting the optical disc is mounted. The sliding stage can be moved along a radial direction of the turntable by the sliding device installed on the exposure apparatus. The movement of the sliding stage is conducted by the tiny sliding device to compensate the position of the optical head, by which a pitch between adjacent tracks can be exposed with a highly accuracy.

Also, conventionally, in order to achieve that the track pitches with a high precision are formed on the optical disc, a laser interferometer or a laser holo-scale having a high resolution is installed on a slider propagating device that is used for mounting the recording head in a mastering device. By which, a slider propagating deviation of the mastering device is detected, and the propagating deviation is optically corrected by deviating the laser beams using an audio optical deviation device. In addition, the propagating slider and the recording head are integrated by a piezo-actuator. Using the retractable piezo-actuator to let the recording head operate, the tiny propagating deviation of the propagating slider is corrected. (see Japanese Laid Open 10-261245).

Moreover, using the exposure system assembled on the slider, laser beams for exposure are focused by an objective lens. A piezoelectric element of the objective lens for fine-tuning positions of a first tremor table is installed on a second tremor table. The optical disc and the turntable for rotating the optical disc are placed on a position opposite to the objective lens. Accordingly, by moving the first tremor table opposite to the vibration direction with the same distance as the vibration of the slider, and then the vibration of the slider is cancelled (see Japanese Laid Open 8-329476).

Additionally, during the rotation of the turntable, among phenomena that turntable vibrates in its (or the optical disc) radial direction, a technology is provided to avoid the influence on the track pitch due to irregular non-synchronized vibration that is irrelevant to the position of a rotation angle of the turntable. In regard to the exposure apparatus for recording desired information on the optical disc by irradiating laser beams thereon, the exposure apparatus comprises a non-synchronized vibration calculating device for calculating the non-synchronized vibration acted along the radial direction of the turntable, and an adjusting device for adjusting the irradiating positions of the laser beams irradiated on the optical disc according to signals from the non-synchronized vibration calculating device (see Japanese Laid Open 9-190651).

Namely, according to the exposure apparatus mentioned above, in a non-contact way a displacement sensor is placed in the radial direction of the turntable. An origin pulse signal of the turntable is triggered and each rotation position of the turntable is measured previously. And an average value by averaging each vibration amount of the angular position of the rotation is memorized and acuminated. The vibration amount measured during the exposure is subtracted by the average value corresponding to each angular position of the rotation, and then only the amount of the non-synchronized vibration is outputted for correcting the irradiating positions of the laser beams using the adjusting device. In the situation, because the exposure apparatus is able to output the non-synchronized vibration irrelevant to each angular position of the rotation of the turntable, and even though in the exposure process the accuracy of the track pitch is exerted serious problem, the non-synchronized vibration can be immediately detected during the exposure process. The exposure process, therefore, can be terminated. Furthermore, it provides a propagation mechanism that is not affected by the non-synchronized vibration of the turntable.

Therefore, according to the conventional exposure apparatus mentioned above, many improvements are required for exposing the track pitch between adjacent tracks on the optical disc with a high-precision accuracy.

Namely, according to the exposure apparatus disclosed in the Japanese Laid Open 10-293928, the head for irradiating laser beams is fixed on the main body of the exposure apparatus through a tiny sliding device, and the moving stage for installing the turntable used for supporting the optical disc is moved along the direction of the turntable by tiny sliding device fixed on the main body. With respect to the moving position of the moving stage, the position of the head for irradiating laser beams is corrected by the tiny sliding device. Therefore, the track pitches between adjacent tracks are exposed with a high-precision accuracy.

However, because the optical disc is usually placed on the turntable with an eccentricity of several ten $\mu$m with respect to the outer radius, the rotation mechanism generates rotational vibration due to the centrifugal force during rotation. Therefore, the irradiation position of the laser beam at side of the turntable varies with the rotation angle, thereby it cannot calculate the correct difference in the propagating direction. As a result, it cannot perform an accurate correction because the tiny sliding device is moved according to the incorrect measured signal. In contrast, track pitches are changed and the exposure quality becomes worse.

In addition, according to the processing method for the optical disc disclosed in the Japanese Laid Open 10-261245, the laser interferometer or the laser holo-scale are assembled for detecting a small propagating deviation of the slider, thereby the small propagating deviation of the slider is optically corrected by deviating the laser beams using an audio optical deviation device. Namely, the laser interferometer or the laser holo-scale is assembled for detecting small propagating deviation of the slider. In addition, the propagating slider and the recording head are integrated by a piezo-actuator. Using the retractable piezo-actuator to let the recording head operate, the tiny propagating deviation of the propagating slider is corrected.

However, because the pitch accuracy formed on the optical disc is determined by the relative vibration between the turntable and the moving stage, it is worse for the correction accuracy to perform the propagating correction by only using the detected result of the slider. As a result, the exposure quality cannot be increased and enhanced.

Next, according to according to disclosure in the Japanese Laid Open 8-329476, in order to eliminate the tiny vibration of the slider according to insufficient propagating servo gain due to that the small vibration of the slider driven by friction and the mechanical resonant frequency of the propagating device are low, a piezoelectric element of the objective lens for fine-tuning positions of a first tremor table is installed on a second tremor table. Accordingly, by moving the first tremor table opposite to the vibration direction with the same distance as the vibration of the slider, and then the vibration of the slider is cancelled.

However, as same as the method in the Japanese Laid Open 10-261245, it is worse for the correction accuracy to perform the propagating correction by only using the detected result of the slider. As a result, the exposure quality cannot be increased and enhanced.

In addition, according to the disclosures in the Japanese Laid Open 10-293928, Japanese Laid Open 10-261245, and Japanese Laid Open 8-329476, because the piezoactuator used as the correction mechanism for the propagating direction is installed on the fore-end or frame of the optical head, the structure is complex and its assembly is very difficult. In addition, the mechanical rigidity is reduced, and the servo gain of the propagating device cannot be set high, which inconvenient control occurs.

SUMMARY OF THE INVENTION

Therefore, it is an objective of the invention to provide an exposure apparatus for an optical disc. A laser beam emitted from a laser source passes through an exposure system and a condensing device, and then irradiates on the optical disc put on a rotation mechanism fixed on a base. When a pre-determined information is recorded on the optical disc, a base transporting force measuring device is used for measuring a transporting force in the propagating direction to the base that is involved a rotation of the rotation mechanism. By a controller, according to a result of the base transporting force measuring device, it controls the vibrator to vibrate, thereby the transporting force in the propagating direction acted on the base is cancelled. Therefore, it can suppress the propagating component of the rotational vibration when the optical disc is eccentrically chucked on the rotation mechanism. Thus, the propagation accuracy is increased and the exposure quality is enhanced.

It is another objective of the invention to provide an exposure apparatus for an optical disc. A laser beam emitted from a laser source passes through an exposure system and a condensing device, and then irradiates on the optical disc put on a rotation mechanism fixed on a base. When a pre-determined information is recorded on the optical disc, a linear encoder transporting force measuring device is used for measuring a transporting force in the propagating direction to the optical linear encoder that is involved a rotation of the rotation mechanism, wherein the optical linear encoder is used for detecting a propagation of the slider that is used for mounting the condensing device and moveably installed on the base. By a controller, according to a result of the linear encoder transporting force measuring device, it controls the vibrator to vibrate, thereby the transporting force in the propagating direction acted on the linear encoder is cancelled. Therefore, it can suppress the propagating component of the rotational vibration when the optical disc is eccentrically chucked on the rotation mechanism. Thus, the propagation accuracy is increased and the exposure quality is enhanced.

It is another objective of the invention to provide an exposure apparatus for an optical disc. A laser beam emitted from a laser source passes through an exposure system and a condensing device, and then irradiates on the optical disc put on a rotation mechanism fixed on a base. When a pre-determined information is recorded on the optical disc, a base transporting force measuring device is used for measuring a transporting force in the propagating direction to the base that is involved a rotation of the rotation mechanism, and furthermore, a linear encoder transporting force measuring device is used for measuring a transporting force in the propagating direction to the optical linear encoder that is involved a rotation of the rotation mechanism, wherein the optical linear encoder is used for detecting a propagation of the slider that is used for mounting the condensing device and moveably installed on the base. By a controller, according to the results of the base transporting force measuring device and the linear encoder transporting force measuring device it controls the vibrator to vibrate, thereby the transporting forces in the propagating direction acted on the base and the optical linear encoder are cancelled. Therefore, it can suppress the propagating component of the rotational vibration when the optical disc is eccentrically clucked on the rotation mechanism. Besides, the vibrations in the propagating direction due to different propagating paths (relative vibration components having different phases), and the vibrations in the propagating direction from outside can be also suppressed. As a result, the propagation precision is increased and the exposure quality is enhanced.

As mentioned above, the controller performs a feedback control to make the vibrator to vibrate as the result of the base transporting force measuring device, the result of the linear encoder transporting force measuring device, or both the results of the base transporting force measuring device and the linear encoder transporting force measuring device converge to zero. Therefore, the assembly, adjustment and design of the control system for the exposure apparatus can be easier. Furthermore, the propagation accuracy is increased and the exposure quality is enhanced with a low cost.

The vibrator mentioned above can be a voice coil actuator of a coil moving type or a magnetic moving type, and comprises a moving part supported by a supporting spring having a pre-determined resilient constant, and a operation axis fixed to the base at a right angle with respect to a surface of the base, wherein the resilient constant of the supporting spring is set in the vicinity of $\omega/\omega c = 2^{1/2}$ in which $\omega$ is an angular frequency used and $\omega c$ is an eigen angular frequency of the vibrator. Therefore, the weight of the vibrator is reduced, and the assembly and adjustment for the exposure apparatus can be easier. Furthermore, the propagation accuracy is increased and the exposure quality is enhanced with a low cost.

In addition, the mass of the moving part of the vibrator and the mass of the optical disc put on the rotation mechanism are set the same. Therefore, the design of the control system for the exposure apparatus can be easier. Furthermore, the propagation accuracy is increased and the exposure quality is enhanced with a low cost.

For achieving the foregoing objectives, the invention provides an exposure apparatus for an optical disc, wherein a laser beam emitted from a laser source passes through an exposure system and a condensing device, and then irradiates on the optical disc put on a rotation mechanism fixed on a base, thereby, a pre-determined information is recorded on the optical disc. The exposure apparatus comprises a slider, for mounting the condensing device and moveably installed on the base; a vibrator, installed on the base, and used for vibrating the condensing device along a propagating direction with respect to the base; a base transporting force measuring device, for measuring a transporting force in the propagating direction to the base that is involved a rotation of the rotation mechanism; and a controller, for controlling the vibrator to vibrate according to a result of the base transporting force measuring device, thereby the transporting force in the propagating direction acted on the base is cancelled.

Therefore, according to the structure of the invention described above, a laser beam emitted from a laser source passes through an exposure system and a condensing device, and then irradiates on the optical disc put on a rotation mechanism fixed on a base. When a pre-determined information is recorded on the optical disc, a base transporting force measuring device is used for measuring a transporting force in the propagating direction to the base that is involved a rotation of the rotation mechanism. By a controller, according to a result of the base transporting force measuring device, it controls the vibrator to vibrate, thereby the transporting force in the propagating direction acted on the base is cancelled. Therefore, it can suppress the propagating component of the rotational vibration when the optical disc is eccentrically chucked on the rotation mechanism. Thus, the propagation accuracy is increased and the exposure quality is enhanced.

For achieving the foregoing objectives, the invention further provides an exposure apparatus for an optical disc, wherein a laser beam emitted from a laser source passes through an exposure system and a condensing device, and then irradiates on the optical disc put on a rotation mechanism fixed on a base, thereby, a predetermined information is recorded on the optical disc. The exposure apparatus comprises a slider, for mounting the condensing device and moveably installed on the base; an optical linear encoder, for detecting a propagation of the slider; a vibrator, installed on the base, and used for vibrating the condensing device along a propagating direction with respect to the base; a linear encoder transporting force measuring device, for measuring a transporting force in the propagating direction to the optical linear encoder that is involved a rotation of the rotation mechanism; and a controller, for controlling the vibrator to vibrate according to a result of the linear encoder transporting force measuring device, thereby the transporting force in the propagating direction acted on the optical linear encoder is cancelled.

According to the structure of the invention described above, a laser beam emitted for a laser source passes through an exposure system and a condensing device, and then irradiates on the optical disc put on a rotation mechanism fixed on a base. When a pre-determined information is recorded on the optical disc, a linear encoder transporting force measuring device is used for measuring a transporting force in the propagating direction to the optical linear encoder that is involved a rotation of the rotation mechanism, wherein the optical linear encoder is used for detecting a propagation of the slider that is used for mounting the condensing device and moveably installed on the base. By a controller, according to a result of the linear encoder transporting force measuring device, it controls the vibrator to vibrate, thereby the transporting force in the propagating direction acted on the linear encoder is cancelled. Therefore, it can supress the propagating component of the rotational vibration when the optical disc is eccentrically chucked on the rotation mechanism. Thus, the propagation accuracy is increased and the exposure quality is enhanced.

For achieving the foregoing objectives, the invention further provides an exposure apparatus for an optical disc, wherein a laser beam emitted for a laser source passes through an exposure system and a condensing device, and then irradiates on the the optical disc put on a rotation mechanism fixed on a base, thereby, a predetermined information is recorded on the optical disc. The exposure apparatus comprised a slider, for mounting the condensing device and moveably installed on the base; a vibrator, installed on the base, and used for vibrating the condensing device along a propagating direction with respect to the base; a base transporting force measuring device, a measuring a transporting force in the propagating direction to the base that is involved a rotation of the rotation mechanism; a linear encoder transporting force measuring device, for measuring a transporting force in the propagating direction to the optical linear encoder that is involved a rotation of the rotation mechanism; and a controller, for controlling the vibrator to vibrate according to results of the base transporting force measuring device and the linear encoder transporting force measuring device, thereby the transporting forces in the propagating direction acted on the base and the optical linear encoder are cancelled.

According to the structure of the invention described above, a laser beam emitted from a laser source passes through an exposure system and a condensing device, and then irradiates on the optical disc put on a rotation mechanism fixed on a base. When a pre-determined information is recorded on the optical disc, a base transporting force measuring device is used for measuring a transporting force in the propagating direction to the base that is involved a rotation of the rotation mechanism, and furthermore, linear encoder transporting force measuring device is used for measuring a transporting force in the propagating direction to the optical linear encoder that is involved a rotation of the rotation mechanism, wherein the optical linear encoder is used for detecting a propagation of the slider that is used for mounting the condensing device and moveably installed on the base. By a controller, according to the results of the base transporting force measuring device and the linear encoder transporting force measuring device, it controls the vibrator to vibrate, thereby the transporting forces in the propagating direction acted on the base and the optical linear encoder are cancelled. Therefore, it can suppress the propagating component of the rotational vibration when the optical disc is eccentrically chucked on the rotation mechanism. Besides, the vibrations in the propagating direction due to different propagating paths (relative vibration components having different phases), ad the vibrations in the propagating direction from outside can be also suppressed. As a result, the propagation precision is increased and the exposure quality is enhanced.

In the situations above, for example, the controller performs a feedback control to make the vibrator to vibrate as the result of the base transporting force measuring device, the result of the linear encoder transporting force measuring device, or both the results of the base transporting force measuring device and the linear encoder transporting force measuring device converge to zero.

As the structure mentioned above, the controller performs a feedback control to make the vibrator to vibrate as the result of the base transporting force measuring device, the result of the linear encoder transporting force measuring device, or both the result of the base transporting force measuring device and the linear encoder transporting force measuring device converge to zero. Therefore, the assembly, adjustment and design of the control system for the exposure apparatus can be easier. Furthermore, the propagation accuracy is increased and the exposure quality is enhanced with a low cost.

In addition, for example, the vibrator is a voice coil actuator of a coil moving type or a magnetic moving type, and comprises a moving part, supported by a supporting spring having a pre-determined resilient constant, and a operation axis, fixed to the base at a right angle with respect to a surface of the base, wherein the resilient constant of the supporting spring is set in the vicinity of $\omega/\omega c=2^{1/2}$ in which $\omega$ is an angular frequency used and $\omega c$ is an eigen angular frequency of the vibrator.

The vibrator mentioned above can be a voice coil actuator of a coil moving type or a magnetic moving type, and comprises a moving part, supported by a supporting spring having a pre-determined resilient constant, and a operation axis, fixed to the base at a right angle with respect to a surface of the base, wherein the resilient constant of the supporting spring is set in the vicinity of $\omega/\omega c=2^{1/2}$ in which $\omega$ is an angular frequency used and $\omega c$ is an eigen angular frequency of the vibrator. Therefore, the weight of the vibrator is reduced, and the assembly and adjustment for exposure apparatus can be easier. Furthermore, the propagation accuracy is increased and the exposure quality is enhanced with a low cost.

Moreover, the mass of the moving part of the vibrator can be set the same as the mass of the optical disc put on the rotation mechanism.

Accordingly, the mass of the moving part of the vibrator and the mass of the optical disc put on the rotation mechanism are set the same. Threrefore, the design of the control system for the exposure apparatus can be easier. Furthermore, the propagation accuracy is increased and the exposure quality is enhanced with a low cost.

For achieving the foregoing objectives, the invention further provides an exposure apparatus for an optical disc, wherein the optical disc is irradiated by laser beams, thereby a predetermined information is recorded on the optical disc. The exposure apparatus comprises an exposure system; a condensing device for condensing exposure beams directed by the exposure system; a slider fixed on a base for mounting the condensing device and capable of moving along a radial direction of the optical disc; a position detector for detecting the radial position of the slider; a slider controller for controlling the slider according to an output of the position detector, a rotation mechanism opposite to the condensing device and capable of freely rotating, and used for mounting the optic disc, a first display for displaying a propagation deviation signal of the slider; a first measuring device for measuring a vibration amount of the base in a direction perpendicular to the propagating direction; a second display for displaying an output signal of the first measuring device; a second and a third measuring device for measuring rotation amounts of the propagating direction and its perpendicular direction of a rotation part of the rotation mechanism; a first control device for outputting a signal to eliminating a rotational vibration transporting force acted on the base according to frequencies and phases of output signals outputted form the second and the third measuring device; and a first and a second vibrators capable of freely vibrating in the propagating direction and its perpendicular direction according to the signal outputted from the first control device.

For achieving the foregoing objectives, the invention further provides an exposure apparatus for an optical disc, wherein the optical disc is irradiated by laser beams, thereby a predetermined information is recorded on the optical disc. The exposure apparatus comprised an exposure system; a condensing device for condensing exposure beams directed by the exposure system; a slider fixed on a base for mounting the condensing device and capable of moving along a radial direction of the optical disc; a position for detecting the radial position of the slider; a slider controller for controlling the slider according to an output of the position detector; a rotation mechanism opposite to the condensing device and capable of freely rotating, and used for mounting the optic disc; a fourth and a fifth measuring devices, for measuring vibration transporting forces in a propagating direction and its perpendicular direction acted on the base when the rotation mechanism rotates, a first servo control device for outputting a signal to eliminating vibration transporting forces in the propagating direction and its perpendicular direction acted on the base according to output signals outputted from the fourth and the fifth measuring device; a first and a second vibrators capable of freely vibrating in the propagating direction and its perpendicular direction according to the signal outputted from the first servo control device.

As described above, the action points of vibration transporting forces generated by the first and the second vibrators, and an action point of the vibration transporting force in the propagating direction acted on the base when the rotation mechanism rotates are all on a same plane, or the action points are on the same plane and line.

For achieving the foregoing objectives, the invention further provides an exposure apparatus for an optical disc, wherein the optical disc is irradiated by laser beams, thereby a predetermined information is recorded on the optical disc. The exposure apparatus comprises an exposure system; a condensing device for condensing exposure beams directed by the exposure system; a slider fixed on a base for mounting the condensing device and capable of moving along a radial direction of the optical disc; a position detector for detecting the radial position of the slider; a slider controller for controlling the slider according to an output of the position detector; a rotation mechanism opposite to the condensing device and capable of freely rotating, and used for mounting the optic disc; a receiver of an optical linear encoder for detecting a propagation of the slider; a sixth and a seventh measuring devices, for measuring vibration transporting forces in a propagating direction and its perpendicular direction acted on the receiver of the optical linear encoder when the rotation mechanism rotates; a fourth and a fifth measuring devices, for measuring vibration transporting forces in the propagating direction and its perpendicular direction acted on the base when the rotation mechanism rotates, a second servo control device for outputting a signal to eliminating vibration transporting forces in the propagating direction and its perpendicular direction acted on the base and the optical linear encoder according to output signals outputted from the fourth, the fifth, the sixth and the seventh measuring devices; and a first and a second vibrators capable of freely vibrating in the propagating direction and its perpendicular direction according to the signal outputted from the second servo control device, wherein action points of vibration transporting forces generated by the first and the second vibrators, and an action point of the vibration transporting force in the propagating direction acted on the base when the rotation mechanism rotates are all on a same plane, or the action points are on the same plane and line.

In addition, a relative feedback system for converging the output of the measuring devices to zero is formed by the first and the second servo control devices for outputting signals to the first and the second vibrators for eliminating the vibration transporting force in the propagating direction acted on the base when the rotation mechanism rotates.

The first and the second vibrators are fixed on the base and capable of freely vibrating in the propagating direction and its perpendicular direction, and wherein the first and the second vibrators are voice coil actuators of a coil moving type or a magnetic moving type, and comprise a supporting spring having a resilient constant, in which the resilient constant of the supporting spring is set in the vicinity of $\omega/\omega c=2^{1/2}$ in which $\omega$ is an angular frequency used and $\omega c$ is an eigen angular frequency of the vibrator.

The first and second vibrators are capable of freely vibrating in the propagating direction and its perpendicular direction, and wherein the first and the second vibrators are voice coil actuators of a coil moving type or a magnetic moving type, and masses of moving parts of the first and the second vibrators are respectively the same as a mass of the optical disc put on the rotation mechanism are the same.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DETAILED DESCRIPTION OF THE PREFERRED EMBODIMENTS

Several embodiments are described in detail according to the invention in accordance with the drawings of FIGS. 1~15. It should be noticed that these embodiments are only described in best modes, but not to restrict the scope of the invention. Namely, various implementations can be modified from the following embodiments.

First Embodiment

Figure 1:
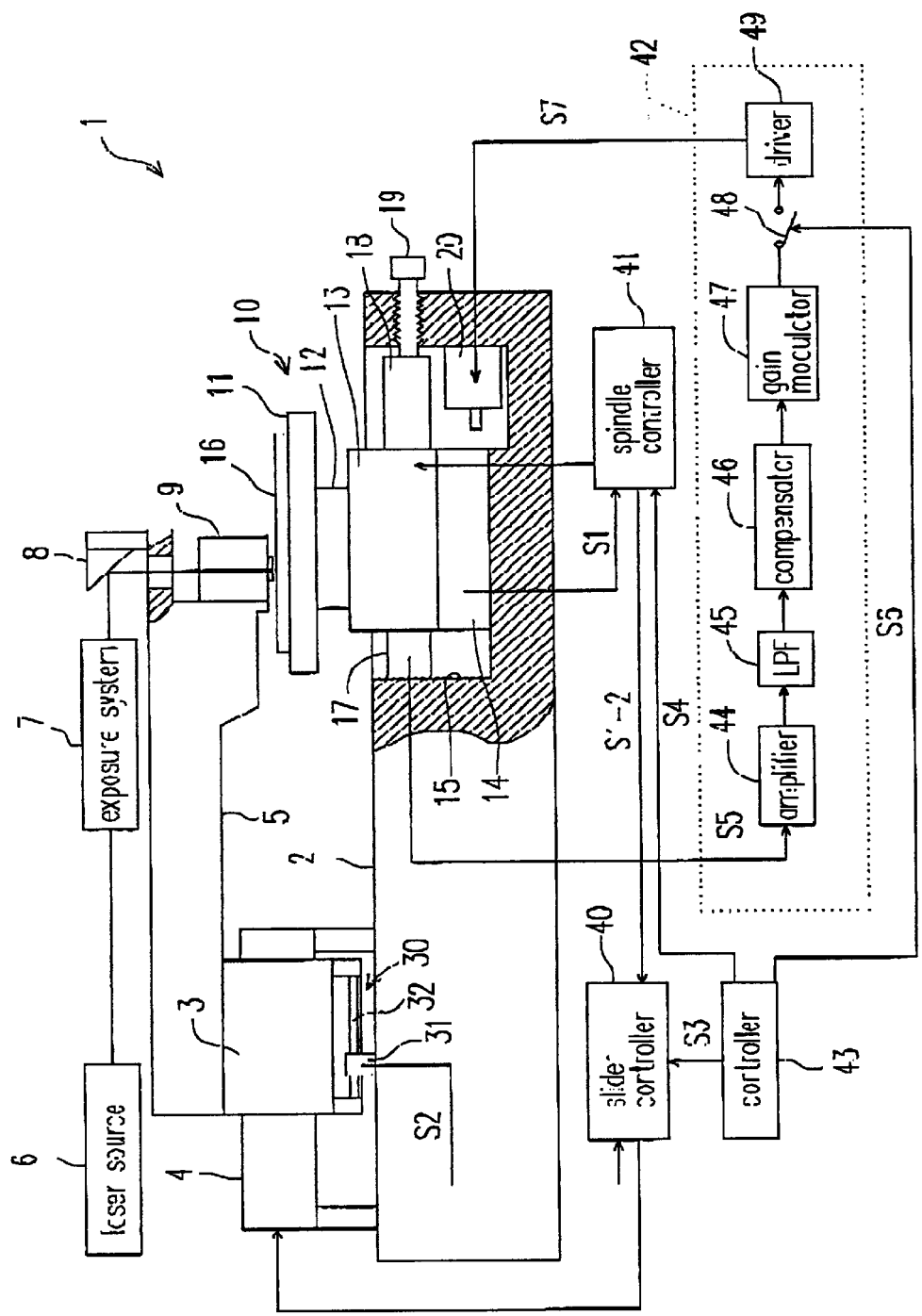
FIG. 1 shows a cross-sectional view from one side of the exposure apparatus according to the first embodiment of the invention.
Figure 2:
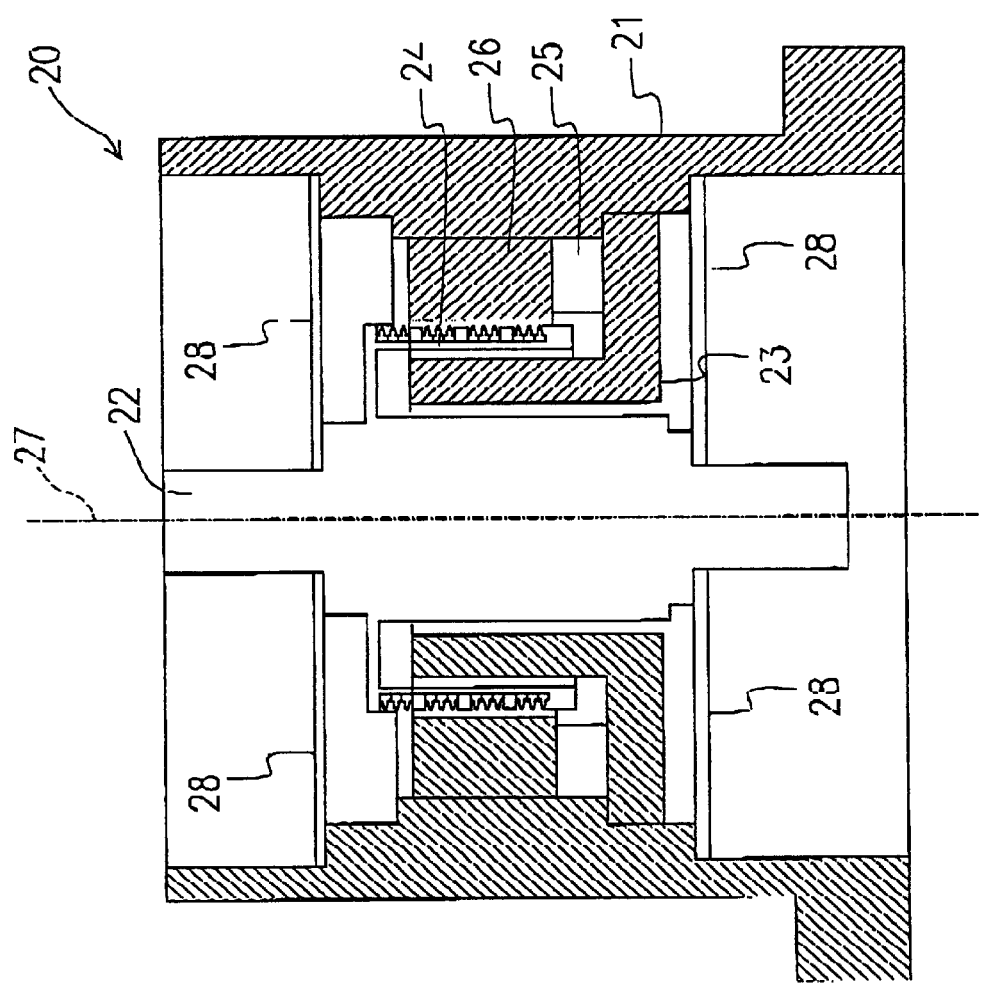
FIG. 2 shows a cross-sectional view of a vibrator in FIG. 1.

FIGS. 1 and 2 show an exposure apparatus according to the first embodiment of the invention. FIG. 1 shows a cross-sectional view from one side of the exposure apparatus of the invention, and FIG. 2 shows a cross-sectional view of a vibrators in FIG. 1.

As shown in FIG. 1, in the exposure apparatus 1, the fixer of a slider 3 is fixed on a base 2 and the base 2 is installed on a vibration eliminating device (not shown), such as a servo mount using air pressure. The slider 3 is floating by a static pressure generated by compressed air supplied externally. One side of a moving plate 5 is fixed on the slider 3, and a laser source 6, an exposure system 7, a folding mirror 8 and a condenser 9 are mounted on the side of the moving plate 5.

A rotation mechanism 10 is installed under the condenser 9. The rotation mechanism 10 comprises a turntable 11, a spindle 12 that is floating along a thrust and a radial directions by a static pressure generated by compressed air supplied externally and capable of freely rotating, an AC synchronized motor 14, and an optical rotary encoder 14 for detecting a rotation angle. The AC synchronized motor 13 and the optical rotary encoder 14 etc., are installed within a recession formed in the base 2. The optical disc 16 to be exposed is placed on the turntable 11. The turntable 11, which is opposite to the condenser 9, chucks the optical disc 16 and then is rotated by the spindle 12. A measurer 17 for measuring a transporting force of the base 2 is installed on the AC synchronized motor 13 of the rotation mechanism 10. For instance, the measurer 17 may consist of load cells for measuring the transporting force in the propagating direction. In addition, the AC synchronized motor 13 is fixed to the base 2 by a screw 19 through a predetermined pressure block 18. The predetermined pressure block 18 also applies a predetermined pressure to the measurer 17.

The optical rotary encoder 14 is used for detecting the rotation angle of the AC synchronized motor 13, and then outputting a rotation angle detection signal S1 comprising an A-phase and a B-phase pulses dividing a circumference by thousands and a Z-phase pulse occurred once per circumference.

The laser source 6 emits laser beams for exposure towards the exposure system 7. The exposure system 7 emits the laser beams generated from the laser source 6 to the folding mirror 8, thereby the laser beams are deflected by the folding mirror 8 and propagated to the condenser 9. The condenser 9 can be a voice coil actuator equipped with an objective lens having high numerical aperture (NA≧0.9). The laser beams redirected from the folding mirror 8 are then focused on the optical disc 16 for exposure.

Referring to FIG. 2, a vibrator 20 is fixed into the recession 15 of the base 2 in a manner that the operation axis 27 is consistent with the propagating direction of the condenser 9. FIG. 2 shows the cross-sectional view of the vibrator 20. The vibrator 20 comprises a moving part 22 installed within a frame 21, a permanent magnet 25, a second yoke 26, and a supporting spring that is used for supporting the moving part 22 against the frame 21 and moving along the operation axis 27. The permanent magnet 25 is formed in a ring shape having magnetic poles arranged in the vibration direction. A first yoke 23 with a hollow-flange shape and a second yoke 26 with a ring shape are fixed in the permanent magnet 25, and are fixed on the frame 11 by aligning their respective axes. A driving coil 24 is installed on a magnetic consisting of the first yoke 23 with a hollow-flange shape and the second yoke 26 with a ring shape by wiring around the moving part 22. The driving coil 24 is a voice coil actuator of a coil moving type and capable of freely moving along the direction of the operation axis 27 by applying power through the end (not shown) of the driving coil. The inner circumference of the supporting spring 28 is fixed on the two ends of the moving part 11, and the outer circumference of the supporting spring 28 is fixed on the frame 21. Namely, the vibrator 20 is a voice coil actuator of a coil moving type. In addition, the vibrator can be a voice coil actuator of a magnet moving type.

The mass of the moving part 22 is set to be the same as the mass of the optical disc 16. In addition, for increasing the vibration transporting efficiency of the vibrator towards the base 2, the resilient constant of the supporting spring is designed according to that the ration of the angular frequency used $\omega$ and the eigen angular frequency $\omega c$ is in the vicinity of $\omega/\omega c = 1/2$. Accordingly, the vibrator 20 can become more compact and smaller.

Referring to FIG. 1 again, an optical linear encoder 30 is installed under the slider 3. The optical linear encoder 30 comprises a receiver 31 and a scale 32. By means of the movement of the moving plate 5 formed on the slider 3, the optical linear encoder 30 can measure the propagating position of the condenser 9 installed on the other side of the moving plate 5.

The optical exposure apparatus 1 further comprises a slider controller 40, a spindle controller 41, a vibrator controller 42 and a controller 43. The controller 43 is used to control the operations of the slider controller 40, the spindle controller 41 and the vibrator controller 42 such that the optical exposure apparatus 1 can be operated.

A position detection signal S2 from the optical linear encodes 30, as well as a Z-phase output signal S1-Z generated by the optical rotary encoder 14 from the spindle controller 41 are inputted to the slider controller 40. The slider controller 40 begins the control operation in response to an operation start command signal S3 from the controller 43. And then, according to the position detection signal S2 from the optical linear encoder 30 and the Z-phase output signal S1-Z from the spindle controller 41, the driver of the slider 3, such as a DC linear motor, is driven.

The rotation angle detection signal S1 from the optical rotary encoder 14 is inputted to the spindle controller 41, and the spindle controller 41 begins the control operation in response to an operation start command signal S4 from the controller 43. The rotation control for the AC synchronized motor 13 is performed according to the rotation angle detection signal S1 from the optical rotary encoder 14, and the Z-phase output signal S1-Z outputted from the optical rotary encoder 14 is inputted to the slider controller 40. Because the spindle controller 41 outputs the Z-phase output signal S1 Z outputted from the optical rotary encoder 14 towards the slider controller 40, the propagation and rotation operations can be concordant.

Referring to FIG. 1, the vibrator controller 42 comprises an amplifier 44, a low pass filter (LPF) 45, a compensator 46, a gain modulator 47, a switch 48 and a drive 49. A signal S5 of the transporting force in the propagating direction detected by the measurer 17 is inputted to the amplifier 44. The amplifier then amplifies the signal S5 and outputs to the LPF 45. The LPF 45 cuts off the signal S5 having frequency above a predetermined cut-off frequency for eliminating noise, and then only the signal S5 having frequency is lower than the cut-off frequency is outputted to the compensator 46. As the signal S5 approaches zero, the compensator 46 outputs a compensating signal for making the vibrator operation to the gain modulator 47. The gain modulator 47 modulates the gain of the compensating signal from the compensator 46, and then outputs to the switch 48. The switch 48 switches to open or close in response to an on/off signal from the controller 43, by which the gain modulator 47 is connected or disconnected to the driver 49. When the switch 48 is on and the gain modulator 47 is connected to the driver 49, the modulated compensating signal from the gain modulator 47 is inputted to the driver 49. The driver 49 then outputs a driving signal S7 to the vibrator 20 in response to the modulated compensating signal.

The vibrator 20 vibrates according to the driving signal S7 inputted from the driver 49. As the signal S5 outputted from the measurer 17 converges to zero, the vibrator 20 begins to vibrate the moving part 22.

Therefore, all of the measurer 17, the vibrator controller 42 and the vibrator 20 forms a relative feedback system that makes the output of the measurer 17 converges to zero.

Next, the operation of the exposure apparatus according to the invention is further described in detail. According to the embodiment of the invention, the exposure apparatus for the optical disc, when the optical disc 16 is rotated the transporting force in the propagating direction acted on the base 2 is measured, and then the vibrator 20 is activated by the vibrator controller 42 to vibrate to eliminate the transporting force in the propagating direction. Therefore, it can suppress the propagating component of the rotational vibration when the optical disc 16 is eccentrically chucked on the rotation mechanism 10. Thus, the propagation accuracy is increased and the exposure quality is enhance.

Namely, before the rotation and propagation operation begin, the on/off signal from the controller 43 is outputted to the switch 48 of the vibrator controller 42, and the switch is on.

As the switch 48 is on, the servo control for the vibrator due to the vibrator controller 42 begins to act. For the propagating component of the external vibration acted on the base 2, as the signal S5 of the transporting force in the propagating direction outputted from the measurer 17 becomes zero, the vibrator controller 42 controls the vibration of the vibrator 20.

Next, controller 40 outputs operation start command signals S3, S4 to the slider controller 40 and the spindle controller 41, thereby the AC synchronized motor 13 is driven to rotate. The optical disc 16 eccentrically chucked on the turntable 11 by several ten $\mu m$ begins to rotate, and also the control for the rotation of the AC synchronized motor 13 is executed according to the rotation angle detection signal S1 detected by the optical rotary encoder 14. In addition, at the time, the spindle controller 41 outputs the Z-phase output signal S1-Z selected from the Z-phase pulse in the rotation angle detection signal S1 to the slider controller 40.

On the other hand, the slider controller 40 starts its control operation according to the operation start command signal S3, and therefore to control the driver of the slider 3 according to the position detection signal S2 from the optical linear encoder 30 and the Z-phase output signal S1-Z from the optical rotary encoder 14.

In the exposure apparatus, through the exposure system 7, the folding mirror 8 and the condenser 9, the laser beam emitted by the laser source 6 are focused on the optical disc 16 for exposure.

As the foregoing descriptions, the optical disc 16 is chucked on the turntable 11 by several ten μm begins to rotate, resulting in the overall vibration of the rotation mechanism 10. A vibration transporting force of the sinusoidal wave in the propagating direction is acted on the right end of the measurer 17 that is in contact with the AC synchronized motor 13. At this time, the vibration transporting force acted on the measurer 17 is different and corresponding to that the exposure apparatus 1 is driven by CAV (constant angular velocity) manner that the slider 3 and the rotation mechanism 10 are coordinated to operate with a constant angular velocity, or is drive by CLV (constant linear velocity) manner that the slider 3 and the rotation mechanism 10 are coordinated to operate with a constant linear velocity. For example, if the CAV rotation mode is used, the angular velocity is a constant and a sinusoidal vibration transporting force with a constant frequency is applied; on the other, if the CLV rotation mode is used, at the radial position for exposure, a sinusoidal vibration transporting force with frequency lower than the frequency of the outer circumference. The vibrator controller 42 outputs the driving signal S7 to the vibrator 20, and controls the vibrator 20 by the mentioned servo control as the output signal of the measurer 17 approaches zero. Namely, the vibrator 20 is controlled to generate a vibration that has a reversed phase with sinusoidal vibration transporting force and acts on the base 2. The vibrator 20 vibrates in response to the driving signal S7 from the vibrator controller 42.

Therefore, the vibration of the base in the propagating direction due to that the optical disc 16 is eccentrically chucked on the turntable 11 can be cancelled by the vibration of the vibrator 20. Thus, the propagating accuracy is increased and the exposure quality is also enhanced.

Second Embodiment

Figure 3:
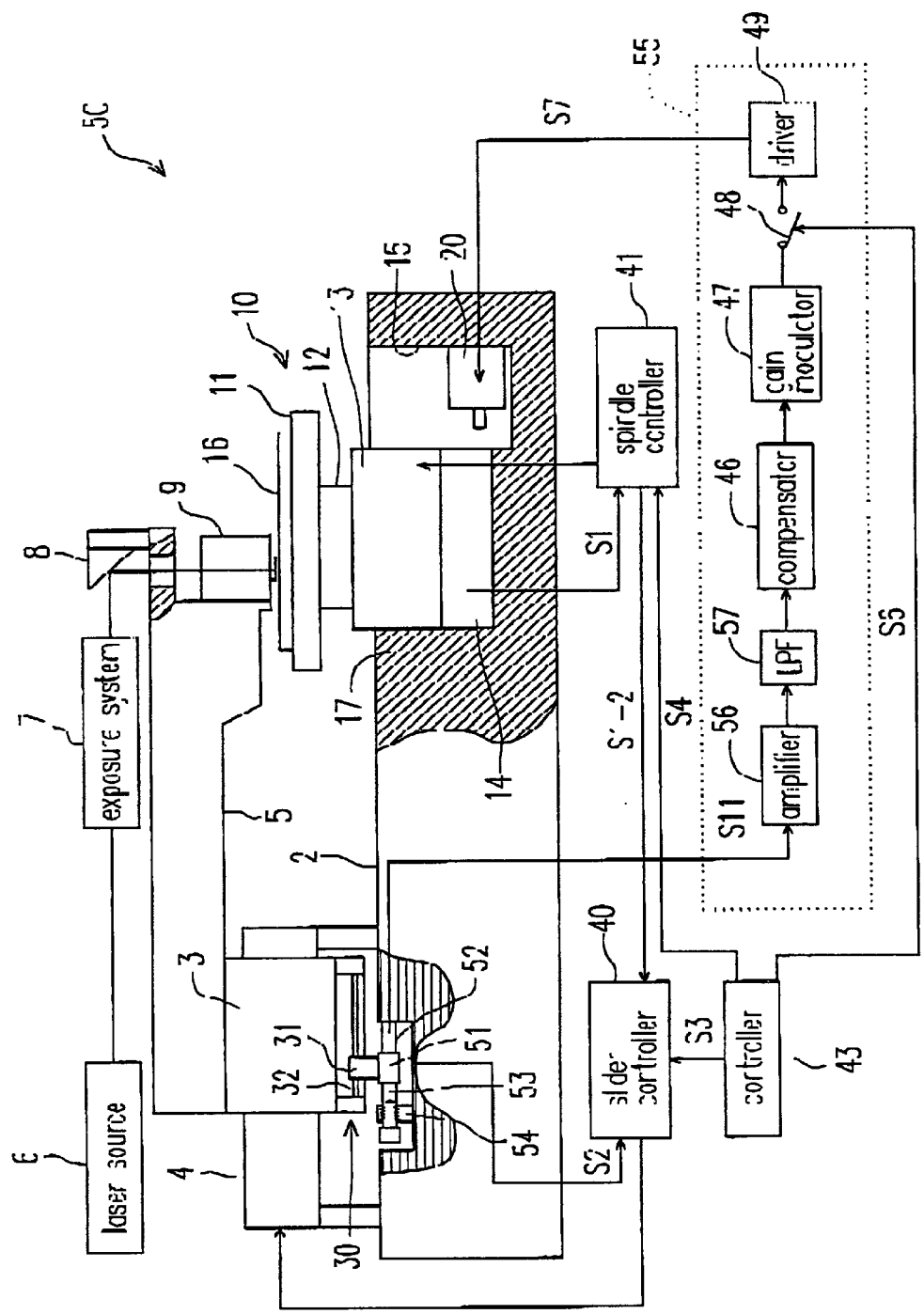
FIG. 3 shows a cross-sectional view from one side of the exposure apparatus according to the second embodiment of the invention.

FIG. 3 shows a cross-sectional view of an exposure apparatus for an optical disc according to the second embodiment of the invention.

In addition, similar to the exposure apparatus shown in the first embodiment, a measurer is assembled on an installer of an optical linear encoder installed under the slider. In the second embodiment, the components same as the first embodiment are labeled in the same numerals and their corresponding detail descriptions are omitted.

As shown in FIG. 3, in the exposure apparatus for the optical disc 50, the fixer 4 of a slider 3 is fixed on a base 2 that is installed on a vibration eliminating device (not shown). An optical linear encoder 30 is installed under the slider 3. The optical linear encoder 30 comprises a receiver 31 and a scale 32. By means of the movement of the moving plate 5 formed on the slider 3, the optical linear encoder 30 can measure the propagating position of the condenser 9 installed on the other side of the moving plate 5.

The receiver 31 of the optical linear encoder 30 is fixed on the installer 51. The installer 51 is gripped by a measurer 52 and a fixer 53 that applies a predetermined pressure to the measurer 52. The fixer 53 is fixed to the base 2 through a fixing block 54. The measurer 52 is used for measuring and detecting the vibration transporting force in the propagating direction.

In addition, similarly, the rotation mechanism 10 also comprises the turntable 11, the spindle 12 and the AC synchronized motor 13. The AC synchronized motor 13 and the optical rotary encoder 14 etc. are directly formed in the recession 15 of the base 2 without intervenient parts.

The vibrator 20 is substantially operated in the same manner as the first embodiment. However, the base 2 is used as a medium for transporting vibration, and the vibration phase must be different from the situation in the first embodiment.

The vibrator controller 55 comprises a LPF 57 and an amplifier 56 suitable for the propagating transporting force signal S11 that is a detected signal of the measurer 52 installed under the slider 3. Similar to the vibration controller 42 of the first embodiment, the vibrator controller 55 further comprises a compensator 46, a gain modulator 47, a switch 48 and a driver 49. As the signal S11 from the LPF 57 approaches zero, the compensator 46 outputs a compensating signal for making the vibrator operation to the gain modulator 47. The gain modulator 47 modulates the gain of the compensating signal from the compensation 46, and then outputs to the switch 48. The switch 48 switches to open or close in response to an on/off signal from the controller 43, by which the gain modulator 47 is connected or disconnected to the driver 49. When the switch 48 is on and the gain modulator 47 is connected to the driver 49, the modulated compensating signal from the gain modulator 47 is inputted to the driver 49. The driver 49 then outputs a driving signal S7 to the vibrator 20 in response to the modulator compensating signal.

Except the description above, the exposure apparatus 50 for the optical disc of the second embodiment has the same structure as the first embodiment.

In the second embodiment, the base 2 is vibrated by the transporting force in the propagating direction that is generated by the rotation of the rotation mechanism 10. The base 2 serves as a vibration transporting medium, and through measurer 52 and the installer 51 the vibration of the base 2 is transported to the receiver 31 that is used for measuring the propagating position.

At this time, a vibration transporting force, represented by the product of the transported vibration acceleration and the total masses of the receiver 31 and installer 51, is generated and used as a transporting output in the propagating direction of the measurer 52. The measurer 52 then outputs the propagating transporting signal S11 corresponding to the transporting output in the propagating direction to the amplifier 56.

The vibrator controller 55 utilized the amplifier 56 to amplifies the transporting signal S11 inputted from the measurer 52, and then the signal S11 is processed by the LPF 57. As the transporting signal S11 approaches zero, the compensator 46 the compensator 46 outputs the compensating signal for making the vibrator operation to the gain modulator 47. The compensated signal is modulated by the gain modulator 47, and then inputted to the driver 49 through the switch 48.

Therefore, the vibrator 20 is operated as the transporting force in the propagating direction that is transported to the measurer 52 approaches zero, thereby the propagating component of the vibration due to the rotation is cancelled.

As a result, the vibration generated by the rotation and acted on the slider 3 can be eliminated. Thus, high-precision propagation operation can be performed, and the exposure accuracy can be enhanced.

Third Embodiment

Figure 4:
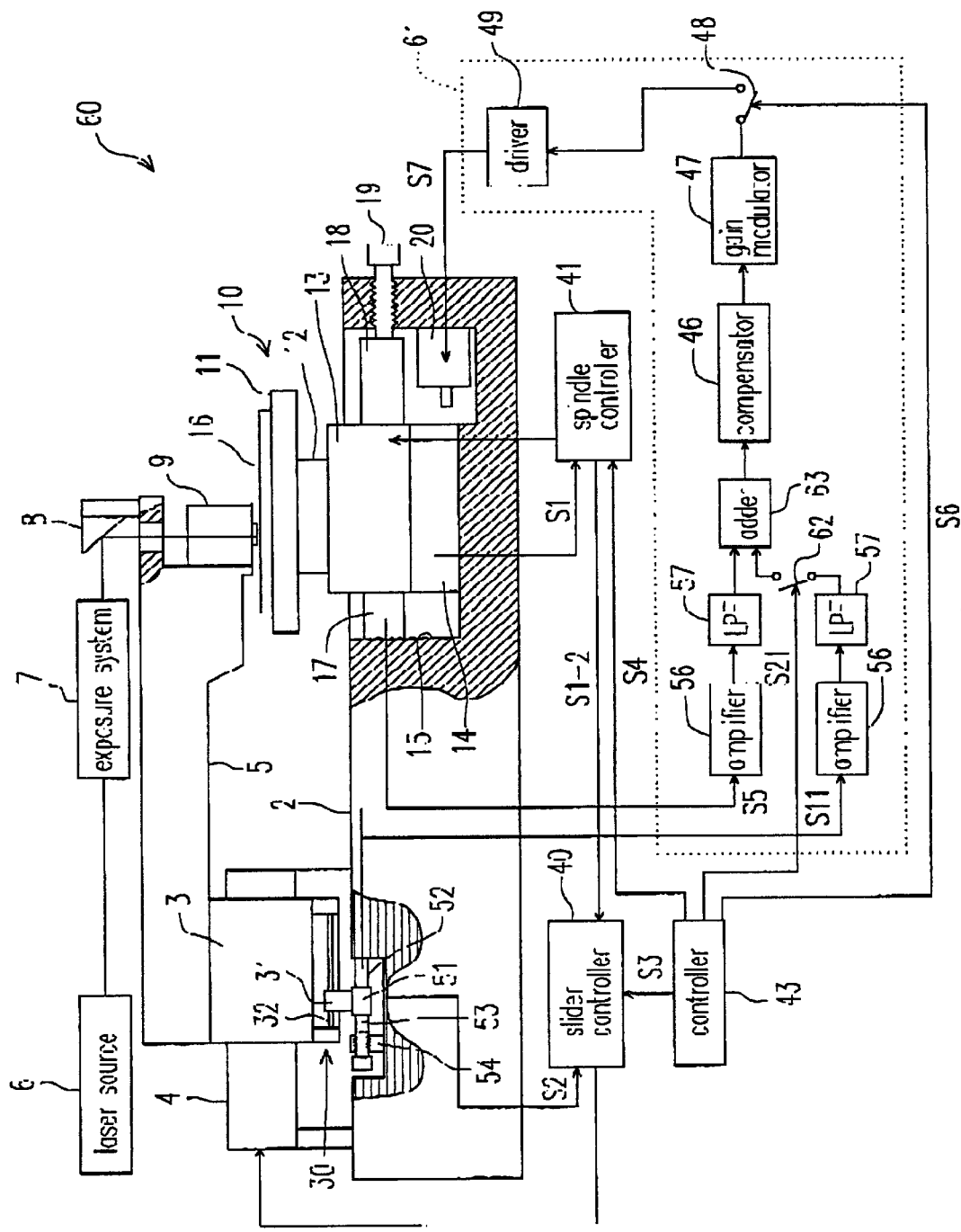
FIG. 4 shows a cross-sectional view from one side of the exposure apparatus according to the third embodiment of the invention.

FIG. 4 shows a cross sectional view of an exposure apparatus for an optical disc according to the third embodiment of the invention.

In addition, the third embodiment is a combination of the first and the second embodiments. Measurers are installed under the rotation mechanism and the slider. Similarly, in the third embodiment, the components same as the first and the second embodiment are labeled in the same numerals and their corresponding detail descriptions are omitted.

As shown in FIG. 4, in the exposure apparatus for the optical disc 60, the receiver 31 of the optical linear encoder 30 installed under the slider 3 is fixed on the installer 51. The installer 51 is gripped by an measurer 52 and a fixer 53 that applies a predetermined pressure to the measurer 52. The fixer 53 is fixed to the base 2 through a fixing block 54. The measurer 52 is used for measuring and detecting the vibration transporting force in the propagating direction.

In addition, similarly, as described in the first embodiment, the rotation mechanism 10 also comprises the turntable 11, the spindle 12 and the AC synchronized motor 13. The measurer 17 is installed on the AC synchronized motor 13. In addition, the AC synchronized motor 13 is fixed to the base 2 by a screw 19 through a predetermined pressure block 18. The predetermined pressure block 18 also applies a predetermined pressure to the measurer 17.

The vibrator 20 is fixed into the recession 15 of the base 2 in a manner that the operation axis 27 is consistent with the propagating direction of the condenser 9. The vibrator 20 is operated to vibrate according to the driving signal S7 inputted from the driver 49 of the vibrator controller 61. The vibrator 20 begins to vibrate as the transporting signal S5 from the measurer 17, or both of the transporting signal S5 from the measurer 17 and the transporting signal S11 from the measurer 52 approach zero.

As described in the first embodiment, the vibrator controller 61 comprises the amplifier 44, the LPF 45, the compensator 46, the gain modulator 47, the switch 48 and driver 49. Also, the described in the second embodiment, the vibrator controller 61 further comprises the amplifier 56 and the LPF 57. Moreover, the vibrator controller 61 further comprises an adder and a switch 62.

The signal S5 inputted from the measurer 17 is amplified by the amplifier 44 and the inputted to the LPF 45. The amplified signal S5 is processed by the LPF 45, and the inputted to the adder 63. Also, the signal S11 inputted from the measurer 52 is amplified by the amplifier 56 and then inputted to the LPF 57. The amplified signal S11 is processed by the LPF 57, and then inputted to the adder 63 via the switch 62.

The switch 62 switches to open or close in response to the on/off signal S21 from the controller 43, thereby the LPF 57 can be connected or disconnected to the adder 63.

If only the propagating transporting signal S5 from the LPF 45 is inputted to the adder 63, the adder 63 directly outputs the signal S5 to the compensator 46. Additionally, when the switch 62 is on to connect the LPF 57 to the adder 63, both of the propagating transporting signal S5 from the LPF 45 and the propagating transporting signal S11 from the LPF 57 are added by the adder 63, and then the adder 63 output the result to the compensator 46.

If the adder 63 only outputs the propagating transporting signal S5, the compensator 46 outputs a compensating signal for making the vibrator operation to the gain modulator 47 as the signal S5 approaches zero. In addition, if the adder 63 outputs the added signal of the propagating transporting signals S5 and S11, the compensator 46 outputs a compensating signal for making the vibrator operation to the gain modulator 47 as the added signal approaches zero, i.e., both of the propagating transporting signals S5 and S11 approach zero.

The gain modulator 47 modulates the gain of the compensating signal from the compensator 46, and then outputs to the switch 48. The switch 48 switches to open or close in response to an on/off signal from the controller 43, by which the gain modulator 47 is connected or disconnected to the driver 49. When the switch 48 is on and the gain modulator 47 is connected to the driver 49, the modulated compensating signal from the gain modulator 47 is inputted to the driver 49. The driver 49 then outputs a driving signal S7 to the vibrator 20 in response to the modulated compensating signal.

According to the exposure apparatus 60 of the third embodiment, first, before the operation beings, the on/off signal S6 from the controller 43 is inputted to the switch 48 such that the switch 48 is on. Next, the on/off signal S21 from the controller 43 is inputted to the switch 62 such that the switch 62 is on. At this time, the compensator 46 of the vibrator controller 61 outputs the compensating signal for eliminating the propagating component of the vibration coming from outside. Thus, the vibrator 20 begins to vibrate for canceling the propagating component of the vibration coming from outside.

Next, the operation start command signals S3 and S4 from the controller 43 is outputted to the slider controller 40 and the spindle controller 41, and then the rotation operation of the exposure apparatus 60 starts. According to the signal S5 from the measurer 17, the vibrator controller 61 outputs the driving signal S7 to the vibrator 20 to suppress the transporting force in the propagating direction due to the rotational vibration of the rotation mechanism 10. In addition, according to the signal S11 from the measurer 52, the vibrator controller 61 outputs the driving signal S7 to the vibrator 20 to suppress the vibration phase due to that the base 2 is used as a transporting medium and the transporting forces in the propagating direction and its perpendicular direction acted on the optical linear encoder 30 with a large distortion (it usually results from the relative vibration between the rotation mechanism 10 and the slider 3).

As the foregoing description, the propagating component of the vibration due to the rotational vibration of the rotation mechanism 10, the propagating component of the vibration from outside, and the relative vibration between the rotation mechanism 10 and the slider 3 can be entirely cancelled. Accordingly, high-precision propagation operation can be performed and the exposure with a high accuracy can be achieved.

The following embodiments are not related to compensate the relative non-synchronous vibration between the rotation mechanism and the slider, but related to a method for effectively reducing the vibration of the base due to the external vibration.

Fourth Embodiment

Figure 5:
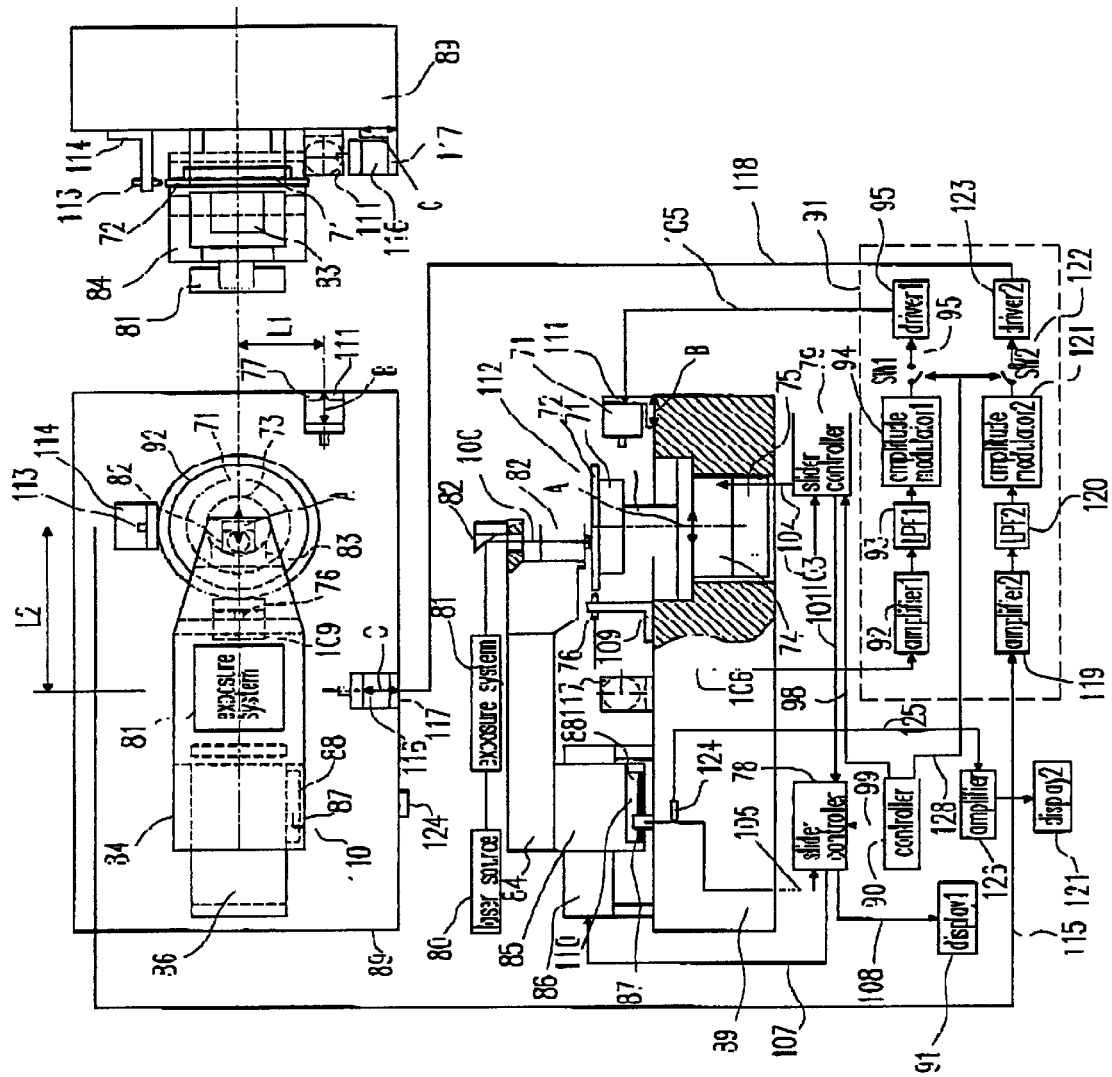
FIG. 5 shows a top view and a cross-sectional view from one side of the exposure apparatus according to the fourth embodiment of the invention.

The fourth embodiment will be described in accordance with the drawings of FIG. 5. FIG. 5 shows a cross-sectional view from side and a top view according to the embodiment. As shown in FIG. 5, a guider 86 of a slider 85 is fixed on a base 89 and the base 89 is installed on a vibration eliminating device (not shown), such as a servo mount using air pressure. The slider 89 is floating by a static pressure generated by compressed air supplied externally (not shown).

One end of a moving stage 84 is fixed on the slider 85, and a laser source 80, an exposure system 81, and a condenser 83 for condensing (focusing )laser beams 100 deflected by a folding mirror 82 formed on the moving 82 formed on the moving stage 84 are mounted on the other end of the moving stage 84.

The condenser 83 can be a voice coil actuator equipped with an objective lens having high numerical aperture (NA>0.9). An optical linear encoder consisting of a scale 88 and a receiver 87 for measuring a propagating position of the condenser 83 is installed under the slider 85, and serves as a position detection device 110 for detecting a radial position.

As shown in FIG. 5, the scale 88 is fixed to the slider 85 and the receiver 87 is fixed on the base 89. However, it is also possible that the receiver 87 is fixed to the slider 85 and the scale 88 is fixed on the base 89. In the recession of the base and opposite to the condenser 83, a rotation mechanism 112 capable of chucking and fixing an optical disc 72 is installed.

The rotation mechanism 112 comprises a turntable 71, a spindle 73, an AC synchronized motor 74 and an optical rotary encoder 75. The spindle 73 can be floating in the thrust and radial directions by a static pressure by applying compressed air that is externally supplied. The optical rotary encoder 75 is used for detecting a rotation angle of the AC synchronized motor 74.

The operation axis 171 of the first vibrator 77 is parallel to the propagating direction of the condenser 83. The first vibrator 77 is installed on the base 89 through a first mounting plate 11 with a distance L1 from the operation axis 171 to the rotational shaft of the rotation mechanism 112. In addition, A second vibrator 116 is installed on the base 89 through a second mounting plate 117 with a distance L2 from the operation axis 171 to the rotational shaft of the rotation mechanism 112, and the operation axis 171 of the second vibrator 116 is perpendicular to the propagating direction of the condenser 83.

Figure 10:
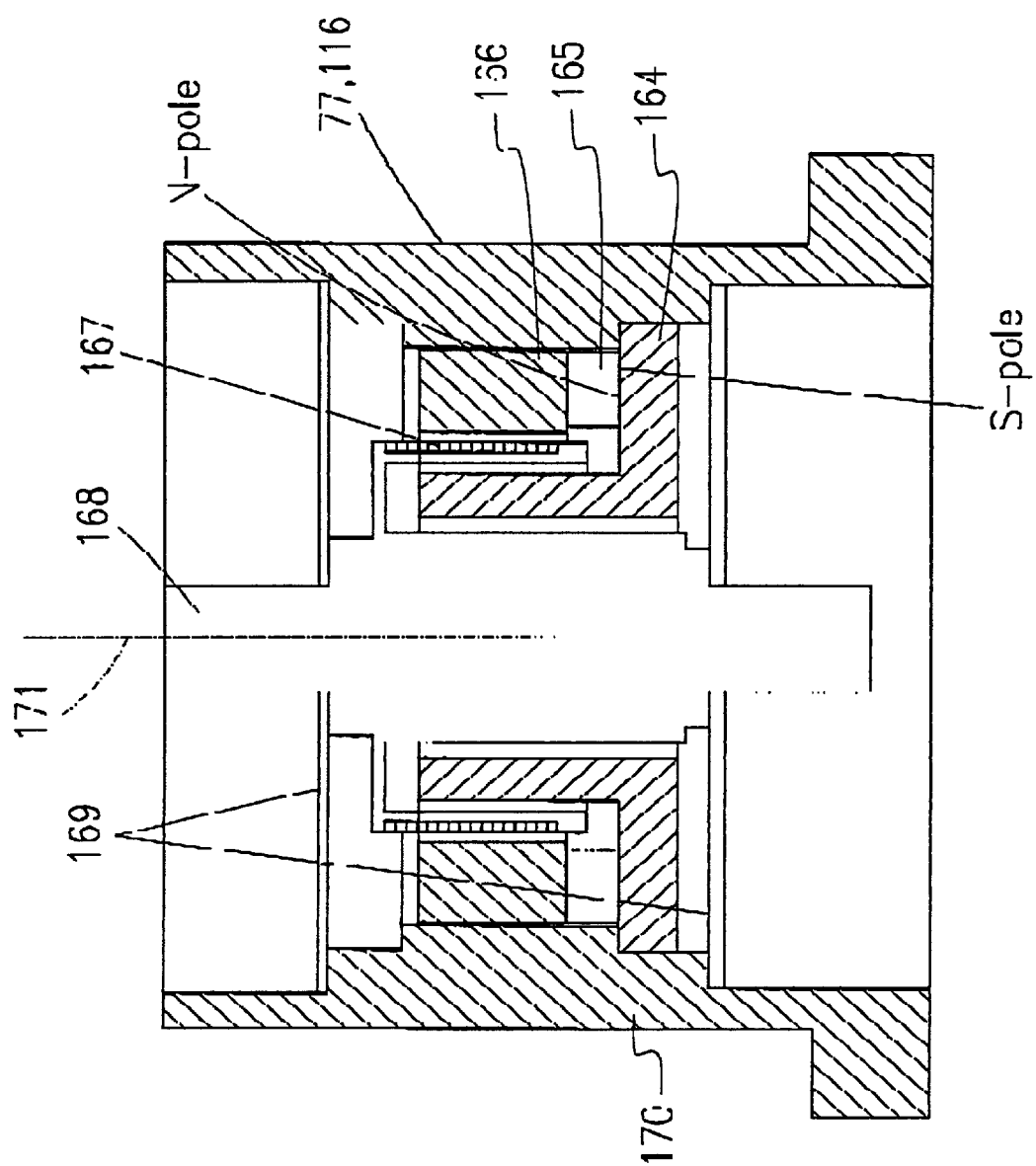
FIG. 10 shows a structure of the vibrator according to the embodiments of the invention.

FIG. 10 shows a cross-sectional view of the first and the second vibrators 77, 116. In the ring-shape permanent magnet 165 having poles arranged along the vibrating direction, a first yoke with a hollow flange shape 164 and a second yoke with a ring shape are assembled together with their respective central axes are coincident, and fixed to a frame 170. In addition, two ends of a moving part 168 with a driving coil wired around its outer circumference are fixed by inner circumferences of supporting springs 169.

The driving coil 167 is located within a magnetic cap formed by the first yoke with a hollow flange shape 164 and the second yoke with a ring shape, which is voice coil actuator of coil moving type. The driving coil can be moved along the operation axis 171 by applying power though a coil end (not shown).

A position detection signal 105 from the position detection device for detecting a radial position is applied to the slider controller 78, and the output 105 of the slider controller 78 is applied to a driver (not shown, for example, a DC linear motor, etc.) of the slider 85.

In addition, a propagating deviation signal 108, which is a difference of a propagating command signal and the position detection signal, is inputted to a first display capable of a visualized display. And, the output of the optical rotary encoder for detecting the rotation angle, in general, consists of an A-phase and a B-phase pulses dividing a circumference by thousands and a Z-phase pulse occurred once per circumference, and is inputted to the spindle controller 79. The output of the spindle controller 79 is inputted to the AC synchronized motor 74.

Furthermore, the spindle controller 79 outputs a Z-phase output signal 101 from the optical rotary encoder 75 to the slider controller 78 for coordinating the propagation and rotation operations. The output signals 99, 98 of the controller 90 are inputted to the slider controller 78 a spindle controller 79 respectively.

A first measurer 124 for measuring a vibration amount at a right angle direction with respect to the propagating direction is fixed on the base 89. The first measurer 124 can be an accelerator pick-up, for example. The output signal of the first measurer 124 is inputted to a second display via an amplifier 126 for a visualized display.

Next, the operation for canceling the effect of rotation vibration generated by the rotation mechanism 112 on the base 89 will be described in detail. A second and a third measurer 76, 113 are installed on the base 89 through mounting plates 109, 114 with respect to the circumference of the compact disc 72 put on the turntable 71 for measuring rotational vibrations in the propagating direction and its perpendicular direction. For example, the second and the third measurer 76, 113 can be displacement sensors of no-contact capacitive type.

The output signal 106 of the second measurer 76 is inputted to the first amplifier 92, and the output signal of the first amplifier 92 is inputted to a first low pass filter (LPF 1) 93. The output signal of the first LPF 93 is inputted to a first amplitude modulator 94, and the output of the first amplitude modulator 94 is inputted to one end of a switch (SW1) 26. In addition, the other end of SW1 26 is connected to a first driver 95, and the output signal 105 of the first driver 95 is connected the coil end (not shown) in the first vibrator 77.

The output signal 115 of the third measurer 113 is inputted to the second amplifier 119, and the output signal of the second amplifier 119 is inputted to a second low pass filter (LPF 2) 120. The output signal of the first LPF 120 is inputted to a second amplitude modulator 121, and the output of the second amplitude modulator 121 is inputted to one end of a switch (SW2) 122. In addition, the other end of SW2 122 is connected to a second driver 123, and the output signal 118 of the second driver 123 is connected the coil end (not shown) in the second vibrator 116.

The first amplifier 92, the LPF1 23, the first amplitude modulator 94, SW1 96, the first driver 95, and the second amplifier 119, the LPF2 120, the second amplitude modulator 121, SW2 122, the second driver 123 construct a first control device 91.

The on/off signal 128 of the SW1 96 and SW2 122 is connected to the controller 90. Next, the operation for canceling the effect of rotational vibration generated by the rotation mechanism of the base will be described in accordance to FIG. 12.

Figure 12:
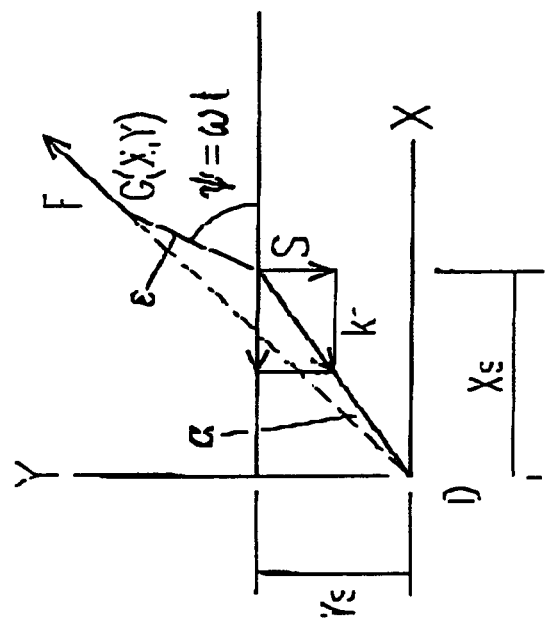
FIG. 12 shows a model for the rotation mechanism.
Figure 12:
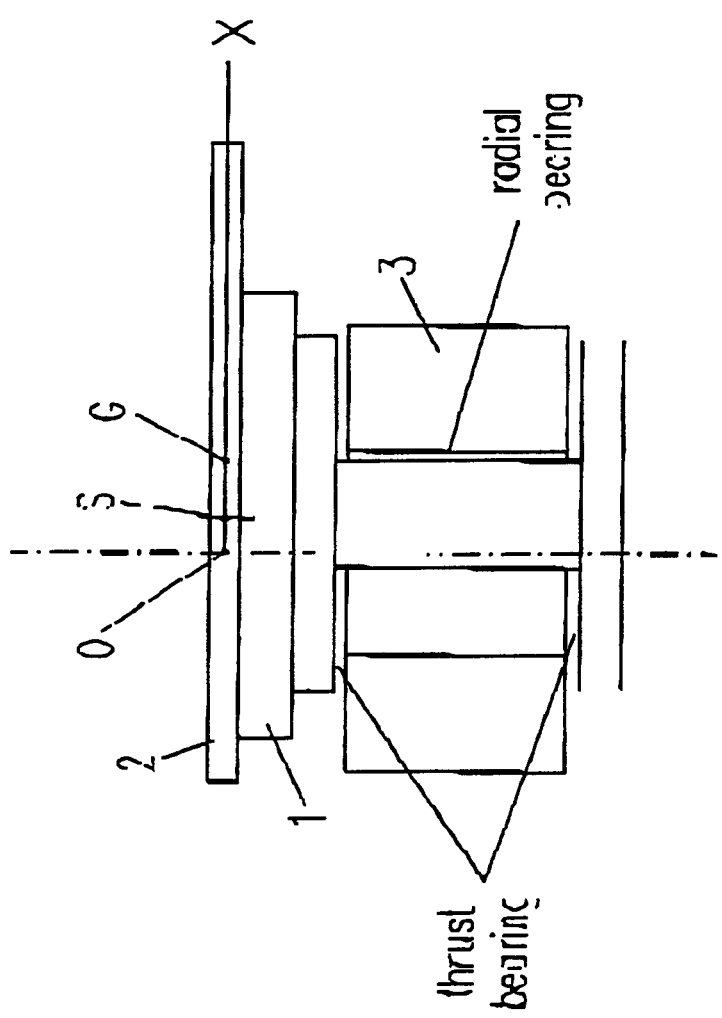

FIG. 12 shows a model for the rotation mechanism. As shown in FIG. 12, the optical disc 72 is put on the turntable 71 with an eccentricity c. Because the spindle 73 is supported by a static pressure in the thrust and the radial directions, its axial shaft corresponds to point S during rotation. If Zs represents a displacement vector of S, then Zs can be expressed by following formula (1):

$$Zs = A \cdot \exp(i \cdot (\omega t - \beta)) \quad (1)$$

where $$A = OS = \epsilon \cdot \omega^2 / p^2 / \{(1 - \omega^2/p^2)^2 + (2 \cdot \zeta \cdot \omega/p)^2\}^{1/2} \quad (2)$$

$$\tan \beta = 2 \cdot \zeta \cdot \omega / p / (1 - \omega^2/p^2) \quad (3)$$

The parameters above are defined as follows: $\omega$: angular frequency; p: eigen angular frequency; $\zeta = Cr/2(MKr)^{1/2}$:

viscosity attenuation coefficient of the rotation mechanism; M: mass of the rotation mechanism; and Kr: rigid coefficient of the static pressure bearing in radial direction. The exposure for the optic disc has two types: one is CAV (constant angular velocity) driving which the slider 85 moves with a constant angular velocity and coordinates operation with the rotation mechanism 112; the other is CLV (constant linear velocity) driving which the slider 85 moves with a constant linear velocity and coordinates operation with the rotation mechanism 112.

From the formulae mentioned above, during the CAV rotation mode ($\omega$=constant), the rotation mechanism keeps a constant displacement in the air spindle and rotates with the angular velocity $\omega$, and OS lags SG by an angle $\beta$. In addition, during the CLV rotation mode, the angular velocity $\omega$ varies according to the radial position of the exposure, which will be described in detail below.

$$Xs = A \cos(\omega t - \beta),$$

and $$Ys = A \sin(\omega t - \beta) \quad (4)$$

The vibration transporting force resulted from the rotation of the rotation mechanism 112 fixed on the base 89 is transported to the base 89 through a radial bearing (static bearing) by a fixing part of the spindle 73.

At this time, the direction of the vector of the vibration force is opposite to the usual direction of a resilient force $Kr \cdot r$ (where r=OS) directed from point S to point O. The vibration transporting force in the propagating direction and its perpendicular direction with respect to the base 89 is represent by Ptx and Pty, and then defined as following formulae:

$$Ptx = A \cdot \{Kr^2 + (Cr \cdot \omega)^2\}^{1/2} \cdot \cos(\omega \cdot t - \beta + \phi)$$

$$Pty = A \cdot \{Kr^2 + (Cr \cdot \omega)^2\}^{1/2} \cdot \sin(\omega \cdot t - \beta + \phi)$$

$$\tan\phi = Cr \cdot \omega / Kr$$

Therefore, if the first and the second vibrators 77, 116 vibrate having a vibration phase reverse to the vibration transporting force, the vibration generated by the rotation of the rotation mechanism 122 can be cancelled.

Next, the operation will be explained in detail. At first, it explains the case that driven in the CAV rotation. Before the rotation and propagation operations begin, the ON signal 128 from the controller 90 is sent to the SW1 96, and SW2 122 such that the SW1 96, and SW2 122 are on. And then, the first control device 91 begins its control operation.

Next, for example, in the situation that the exposure is perform from the inner circumference of the optic disc, after the slider 85 is moved to a desired radial position, the optical disc 72 chucked on the turntable 71 with an eccentric distance about several $\mu$m begins to be rotated with a constant angular velocity by the rotation mechanism 112. At this time, a propagation operation start command 99 from the controller 90 is off, and the propagation operation of the slider 85 is temporally stopped. As the optical disc begins to be rotated with the constant angular velocity, the rotation vibration of the whole rotation mechanism mentioned above is generated.

Figure 13A:
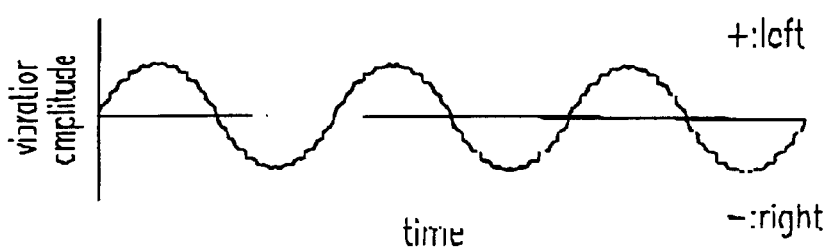
FIGS. 13A~13D show waveforms for signals used in the invention.
Figure 13B:
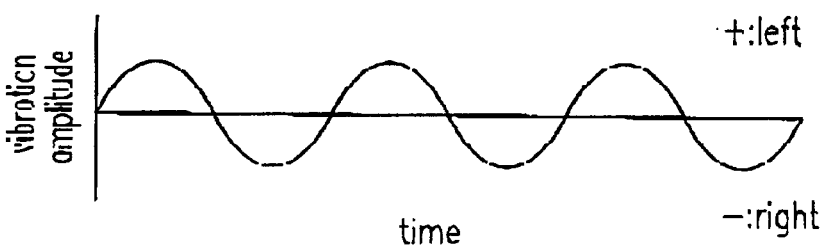

First, FIGS. 13A–13D show related signals concerning about the propagating direction of the rotational vibration. As shown in FIG. 13, the right and left directions are defined with respect to the side view shown in FIG. 5. FIG. 13A shows the output signal 106 from the second measurer 76 is amplified by the first amplifier 92, which a sinusoidal vibration signal is observed. Then, only the required frequency component for control is acquired (for example, a cutoff frequency of several kHz). FIG. 13B shows the signal passed the LPF1 93, which is a sinusoidal vibration signal that high frequency components are cutoff.

Figure 13C:
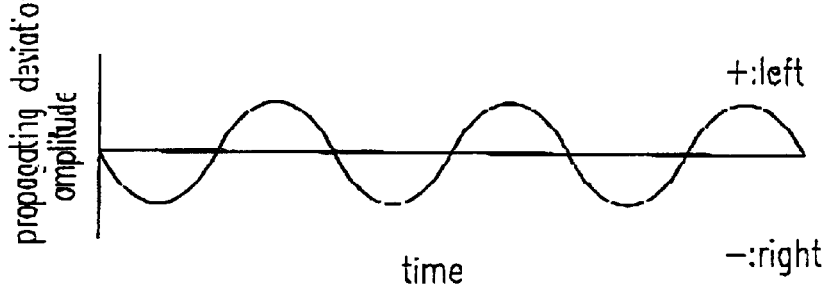

Moreover, at this time, FIG. 13C shows the propagating deviation signal 108 has a reverse phase with respect to that of the signal shown in FIG. 13B, which is displayed on the first display 107. A centrifugal force is acted on the optical disc 72 chucked on the turntable 71 with the eccentric distance of several $\mu$m. The resulted transporting force for the rotational vibration is acted on point A, and has the same phase with the output signal of the second measurer 76, which is transported to the base 89. Then, the base 89 is vibrated with the same frequency of the angular velocity. Because the receiver 87 of the optical linear encoder is fixed on the base 89, and the propagation control is affected by the reverse direction of the rotational vibration, and therefore, the propagating deviation signal 108 is reverse to the output signal of the second measurer 76.

Figure 13D:
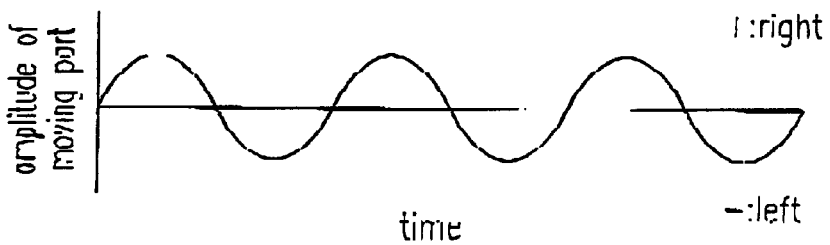

Accordingly, the output signal of the second measurer 76 contains the phase and frequency information, and then process by the LPF1 93. The processed signal from the LPF1 93 can then be modulated to a required amplitude by the first amplitude modulator 94. Through the first amplitude modulator 94 and the first driver 95, the operation performed by the signal shown in FIG. 13D is applied to the first vibrator 77, and then the vibration in the propagating direction acted on the base 89 can be cancelled by manually modulating the volume of the first amplitude modulator 94 referring to the first display 107.

Figure 14A:
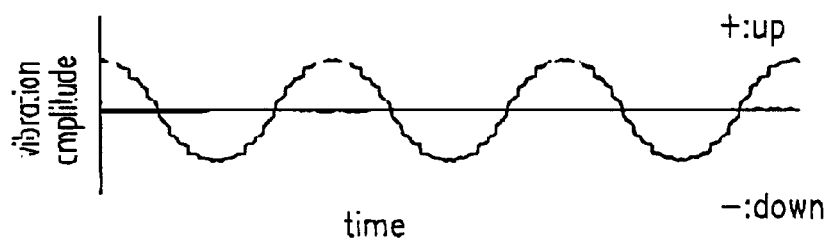
FIGS. 14A~14D show waveforms for signals used in the invention.
Figure 14B:
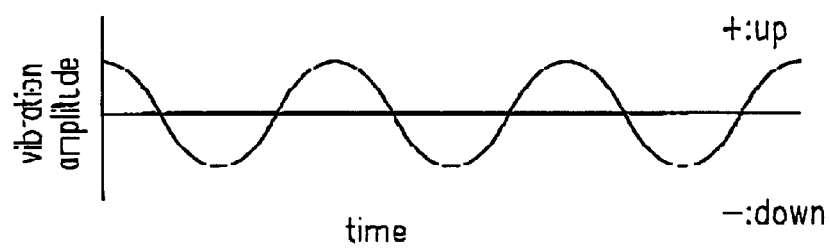
Figure 14C:
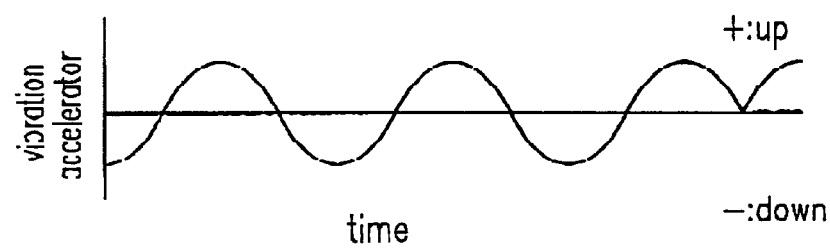
Figure 14D:
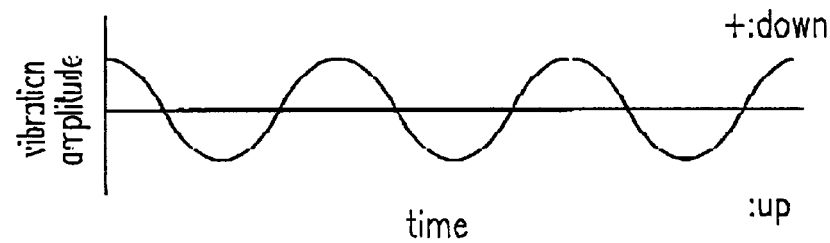
Figure 15B:
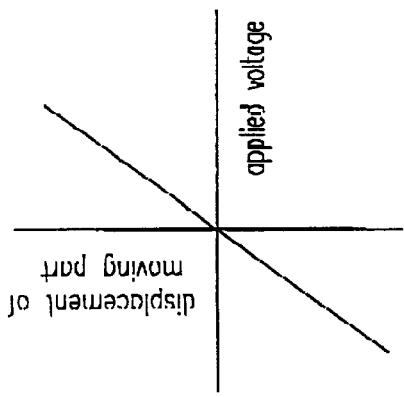
FIGS. 15A~15D show characteristic graphs for elements of the servo control device.
Figure 15D:
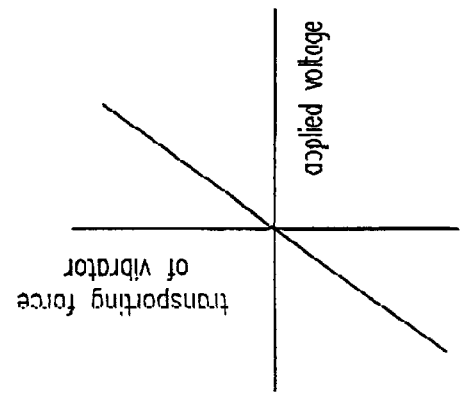
Figure 15A:
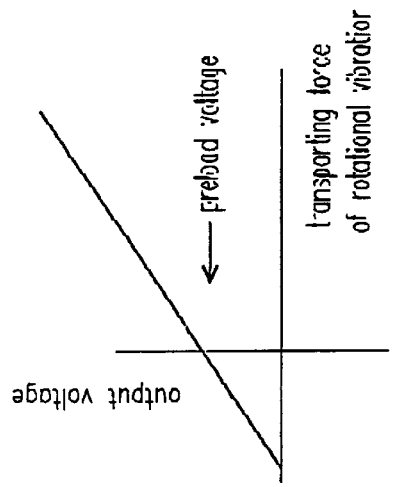
Figure 15C:
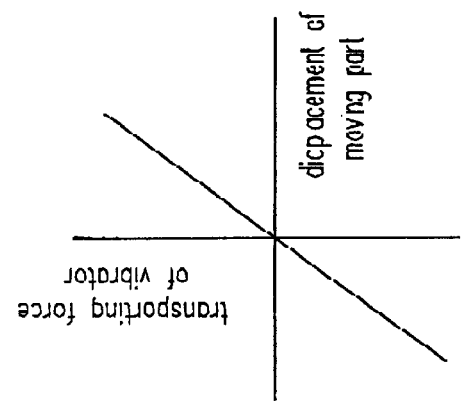

In addition, in regard to the direction perpendicular to the propagating direction of the rotational vibration, FIGS. 14A~14D show the related signals having phase difference of 90 degrees with respect to the respective signals shown in FIGS. 13A~13D. Similar to the situation in the propagating direction, the output signal of the third measurer 113 contains the phase and frequency information, and then process by the LPF2 120. The processed signal from LPF2 120 can then be modulated to a required amplitude by the second amplitude modulator 121. Through the second amplitude modulator 121 and the second driver 123, the operation performed by the signal shown in FIG. 14D is applied to the second vibrator 116, and then the vibration perpendicular to the propagating direction acted on the base 89 can be cancelled by manually modulating the volume of the second amplitude modulator 121 referring to the second display 127.

After manually modulating the volumes of the first and the second amplitude modulators 94, 121, the propagation start command from the controller 90 is ON, and then the slider 85 begins to propagate. In the case driven by the CAV mode, because the eccentricity $\epsilon$ for every optical disc is different, the amplitude modulators 94, 121 have to be adjusted once before each exposure is performed.

Next, it explains the case that driven in the CLV rotation mode. In the CLV rotation mode, the angular frequency of the rotation mechanism 112 has to be varied according to the radial position of the slider 85, i.e., complying with the following formula:

$$N = 60 \times V / (2 \times \pi \times r) \quad (6)$$

wherein N is the rotations per minute, V is the linear velocity (m/s), and r is the radial position. Before the rotation and propagation operation begin, the ON signal 128 from the controller 90 is sent to the SW1 96 and SW2 122 such that W1 96 and SW2 122 are on. And the control operation of the first control device 91 begins.

Next, for example, in the situation that the exposure is perform from the inner circumference of the optic disc, the operation start command signals 98, 99 for the rotation and propagation are sent out by the controller 90. After the slider 85 is moved to a desired radial position, the optical disc 72 chucked on the turntable 71 with an eccentric distance about several µm begins to be rotated with a required angular velocity by the rotation mechanism 112.

At this time, the propagation operation start command 99 from the controller 90 is off, and the propagation operation of the slider 85 is temporally stopped. Similarly to the situation of the CAV rotation mode, the first and second amplitude modulators 94, 121 are modulated to cancel the vibrations along the propagating direction and its perpendicular direction.

The propagation operation start command 99 from the controller 90 is on again, and the slider 85 beings to its propagate operation. In addition, referring to the displays 107, 127, the operator can sequentially and manually modulate the volumes of the amplitude modulators 94, 121 to cancel the vibration of the base 89.

Fifth Embodiment

Next, the fifth embodiment of the invention is described in detail as follows. According to the fourth embodiment, in the situation drive by the CAV rotation mode, referring to the displays 107, 127, the operator has to adjust the amplitude modulators 94, 121 once before each exposure is performed. In addition, n the situation driven by the CLV rotation mode, the operator has to sequentially and manually modulate the volumes of the amplitude modulators 94, 121 to cancel the vibration of the base 89.

Figure 6:
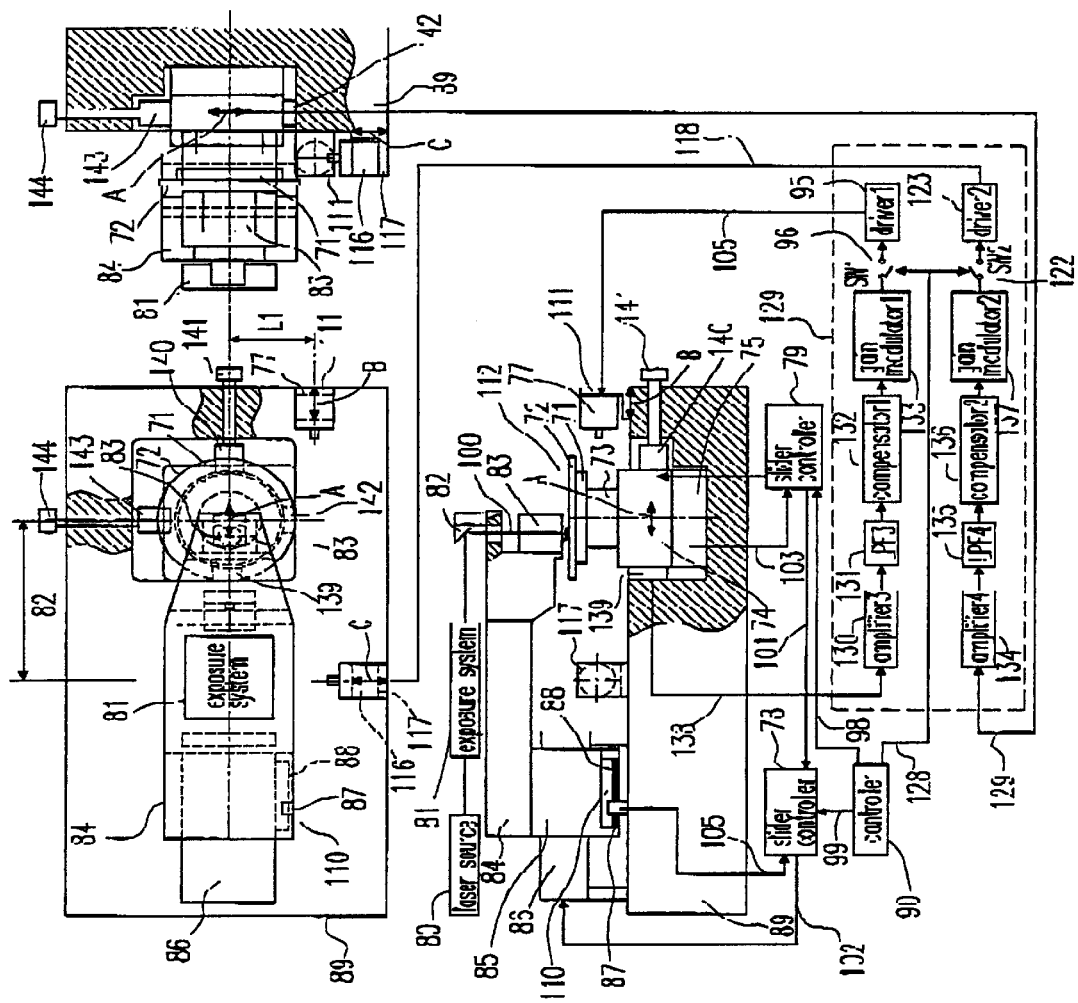
FIG. 6 shows a top view and a cross-sectional view from one side of the exposure apparatus according to the fifth embodiment of the invention.

Under such situations, due to the limitation of the operational speed, it cannot meet the requirement for high-speed exposure operation. Furthermore, because it requires operator operates the exposure apparatus during the exposure operation, it happens such a problem that particles are fallen down the optic disc. Therefore, an exposure apparatus that no operator is required during the exposure operation is proposed. FIG. 6 shows the configuration of the fifth embodiment according to the invention. In addition, the descriptions for the elements as same as the fourth embodiment will be omitted.

In a recession at the right end of the base 89, a rotation mechanism 112 is installed opposite to the condenser 83 and capable of chucking and fixing the optical disc 72. The rotation mechanism 112 can apply a predetermined pressure to two fourth measurers 139 used for measuring the transporting force in the propagating direction. For example, the fourth measurers 139 may consist of load cells. In addition, the fourth measurers 139 are fixed to the base 89 through a first predetermined pressure block 140 used for fixing the rotation mechanism 112 by a screw 141 along the propagating direction. Moreover, the rotation mechanism 112 can apply a predetermined pressure to two fifth measurers 142 used for measuring the transporting force perpendicular to the propagating direction. For example, the fifth measurers 142 may also consist of load cells. In addition, the fifth measurers 142 are fixed to the base 89 through a second predetermined pressure block 143 used for fixing the rotation mechanism 112 by a screw 144 along the direction perpendicular to the propagating direction. In the fifth embodiment, no displays 107, 127 are installed.

Next, the configuration for canceling the vibration of the base 89 is described in detail below. The output signal 138 of the transporting force in the propagating direction from the fourth measurer 139 is connected to the third amplifier 130 that is capable of canceling an offset voltage equivalent to the predetermined pressure applied to the fourth measurer 139. The output of the third amplifier 130 is inputted to the LPF3 131. The output of the LPF3 131 is inputted to the first compensator 132, in which the first compensator 132 is used for adjusting a gain margin (above 10 dB) and a phase margin (above 45 degrees) in the open loop frequency characteristics. The output of the first compensator 132 is inputted to the first gain modulator 133, and the output of the first gain modulator 133 is connected to one end of switch (SW1) 96.

The other end of the SW1 96 is connected to the first driver 95, and the output of the first driver 95 is connected to the coil end (not shown) of the first vibrator 77. In addition, the output signal 139 of the transporting force perpendicular to the propagating direction from the fifth measurer 144 is connected to the fourth amplifier 134 that is capable of canceling an offset voltage equivalent to the predetermined pressure applied to the fifth measurer 144. The output of the fourth amplifier 134 is inputted to the LPF4 135. The output of the LPF4 135 is inputted to the second compensator 136, in which the second compensator 136 is used for adjusting a gain margin (above 10 dB) and a phase margin (above 45 degrees) in the open loop frequency characteristics. The output of the second compensator 136 is inputted to the second gain modulator 137, and the output of the second gain modulator 137 is connected to one end of switch (SW2) 122.

In addition, the other end of the SW2 122 is connected to the second driver 123, and the output of the second driver 123 is connected to the coil end (not shown) of the second vibrator 136. The third amplifier 130, the LPF3 131, the first compensator 132. the first gain modulator 133, the SW1 96, the first driver 75, and the fourth amplifier 134, the LPF4 135, the second compensator 136, the second gain modulator 137, the SW2 122, the second driver 123 construct a servo control device 129. The ON/OFF signals for the SW1 and SW2 are connected to the controller 90.

Next, the operation under the configuration above is described in detail as follows. Before the rotation and propagation operations begin, the ON signal 128 from the controller 90 is sent to the SW1 96, and SW2 122 such that the SW1 96, and SW2 122 are on. And then, the first control device 91 begins its servo control operation. At this time, as the output signals of the fourth and the fifth measurers 139, 142 approach zero, the first and the second vibrators 77, 116 begin to vibrate with regard to the external vibrations in the propagating direction and its perpendicular direction applied to the base 89.

Next, as the controller 90 outputs the rotation/propagation operation start command signal 98, 99, the optical disc 72 chucked on the turntable with an eccentric distance of several µm begins to rotate. Then the rotational vibration of the whole rotation mechanism is generated, and the sinusoidal vibration transporting forces in the propagation direction and its perpendicular direction are applied to the measurers 139, 142, wherein the phases of the propagation direction and its perpendicular direction are different by 90 degrees.

At this time, if the CAV rotation mode is used, the angular velocity is a constant. Therefore, a sinusoidal vibration transporting force with a constant frequency is applied. If the CLV rotation mode is used, at the radial position for exposure, a sinusoidal vibration transporting force with frequency lower than the frequency of the outer circumference. However, no matter what mode is used, the first and the second vibrators 77, 116 are operated by the servo control device 129 as the output signals of the measurers 139, 142 approaches zero.

On the other words, because the first and the second vibrators 77, 116 vibrate along the propagating direction and its perpendicular direction that have a reverse phase to the vibration phase of the sinusoidal vibration transporting force acted on the base 89, the vibration of the base 89 can be cancelled. The output characteristics of the measurers of the servo system, the displacement characteristics of the vibrators 77, 116, the transporting force and the applied voltage versus the transporting force shown in FIGS. 15A~15D are all linear.

Figure 11:
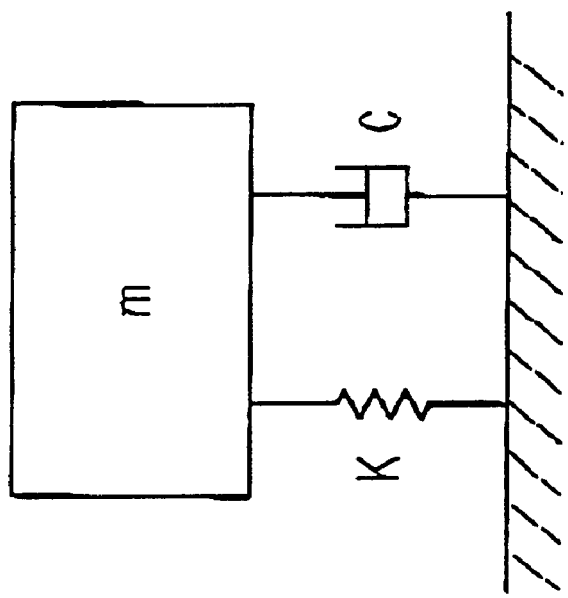
FIG. 11 shows a vibrator model and a driver model.
Figure 11:
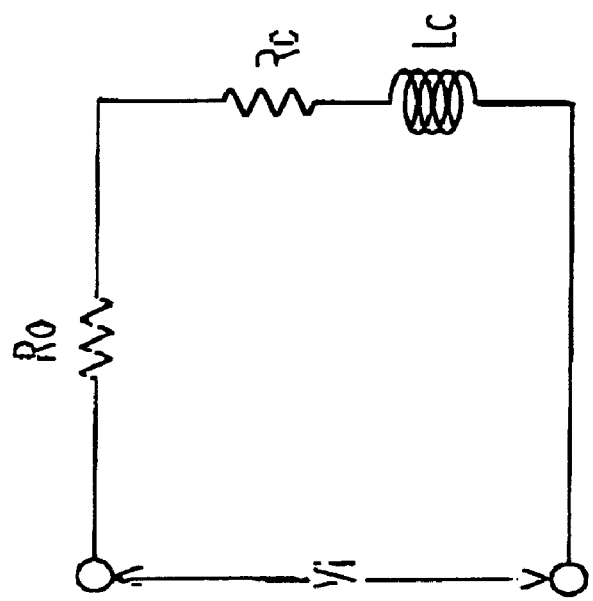

FIG. 11 shows a calculating model of the vibrators 77, 116 and a model of the drivers. The relationship of the transporting force with respect to the input voltage applied to the vibrators 77, 116 is represented by the following transfer function G(s)

$$G(s)=Kf(K+C \cdot s)/\{(ms^2+Cs+K) \cdot (RO+RC+LCs)\} \qquad (7)$$

wherein Kf is a pushing constant of the vibrators, m is the mass of the moving part, K is the coefficient of the supporting spring, C is the attenuation coefficient, RO is the output impedance of the driver, RC is the coil impedance of the vibrator, and LC is the coil inductance of the vibrator. The servo control device is designed according to a transfer function calculated from the transfer function G(s) above and the transfer functions of the LPF3 131, LPF4 135, the first compensator 132 and the second compensator 136

Sixth and Seventh Embodiment

Next, sixth and seventh embodiment are described below. According to the fourth and the fifth embodiments, the operation axes of the first and the second vibrators 77, 116 are parallel to the propagating direction and its perpendicular direction of the condenser 83 respectively. The action positions B, C of the vibration transporting force and the action position A that the vibration transporting force in the propagating direction acted on the base 89 when the rotation mechanism 112 rotates are not at the same surface. The action positions B, C are separated from the action position A by distance L1 and L2 respectively.

In the situation, because all of the vibration transporting forces are not within the same plane, the vibration transporting forces of the first and the second vibrators 77, 116 are not rigorously parallel to the vibration transporting force at the action position A. Accordingly, it results in a vibration in the pitching direction and then the pitching vibration is acted on the base 89, which will affect the accuracy of the track pitch during the exposure for the optic disc 72.

Figure 7:
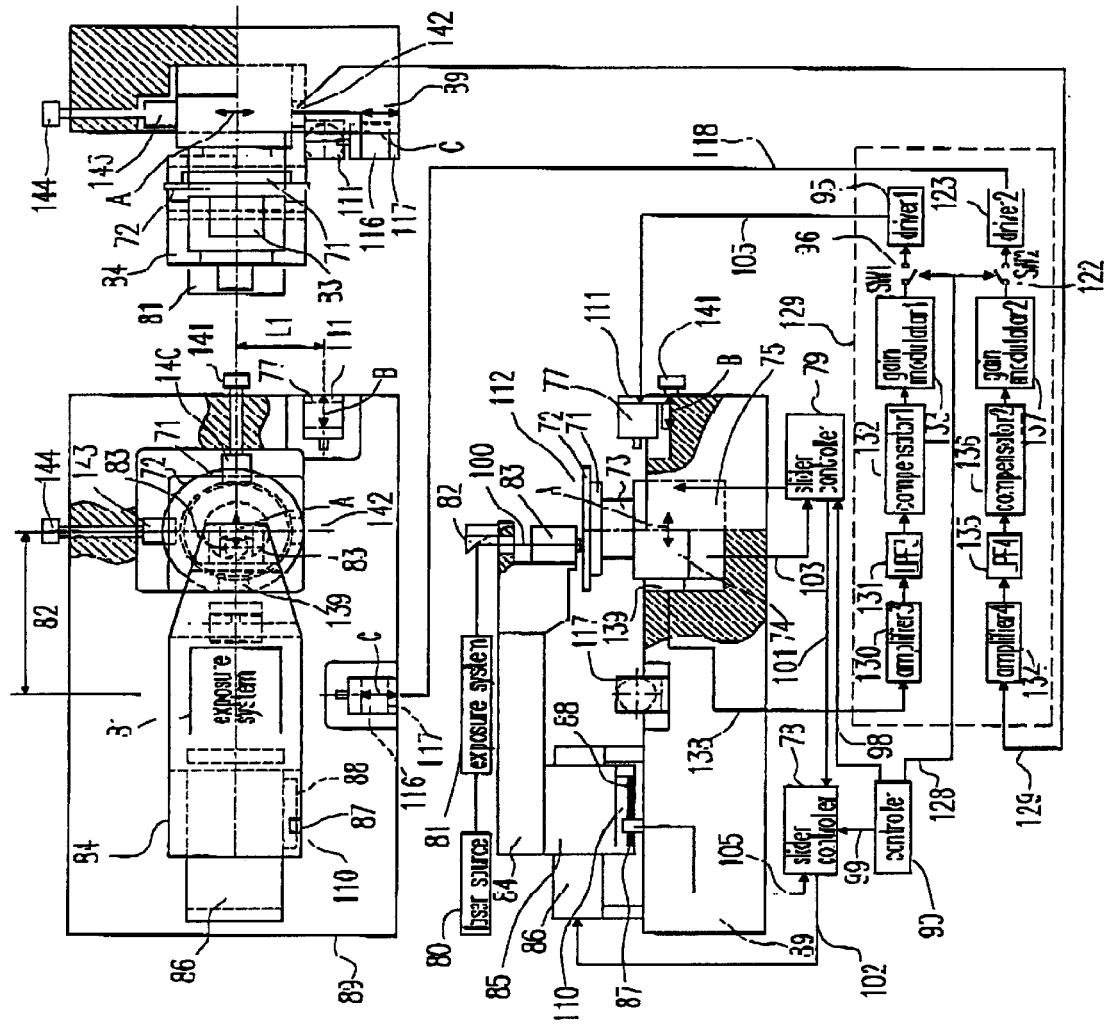
FIG. 7 shows a top view and a cross-sectional view from one side of the exposure apparatus according to the sixth embodiment of the invention.

Therefore, referring to FIG. 7, according to the sixth embodiment, it proposes a configuration that the action position B and C of the vibration transporting forces and the action position A when the rotation mechanism 112 rotates are arranged in the same plane. Even if the action positions A, B and C of the vibration transporting forces are arranged at the same plane, if the distance L1, L2 are too large, it generates a transporting force that induces a vibration in the yawing direction (the rotation direction of the vibration with respect to the drawing of the plane view) of the base 89, which will affect the circumference accuracy of the track pitch during the exposure for the optic disc 72.

Figure 8:
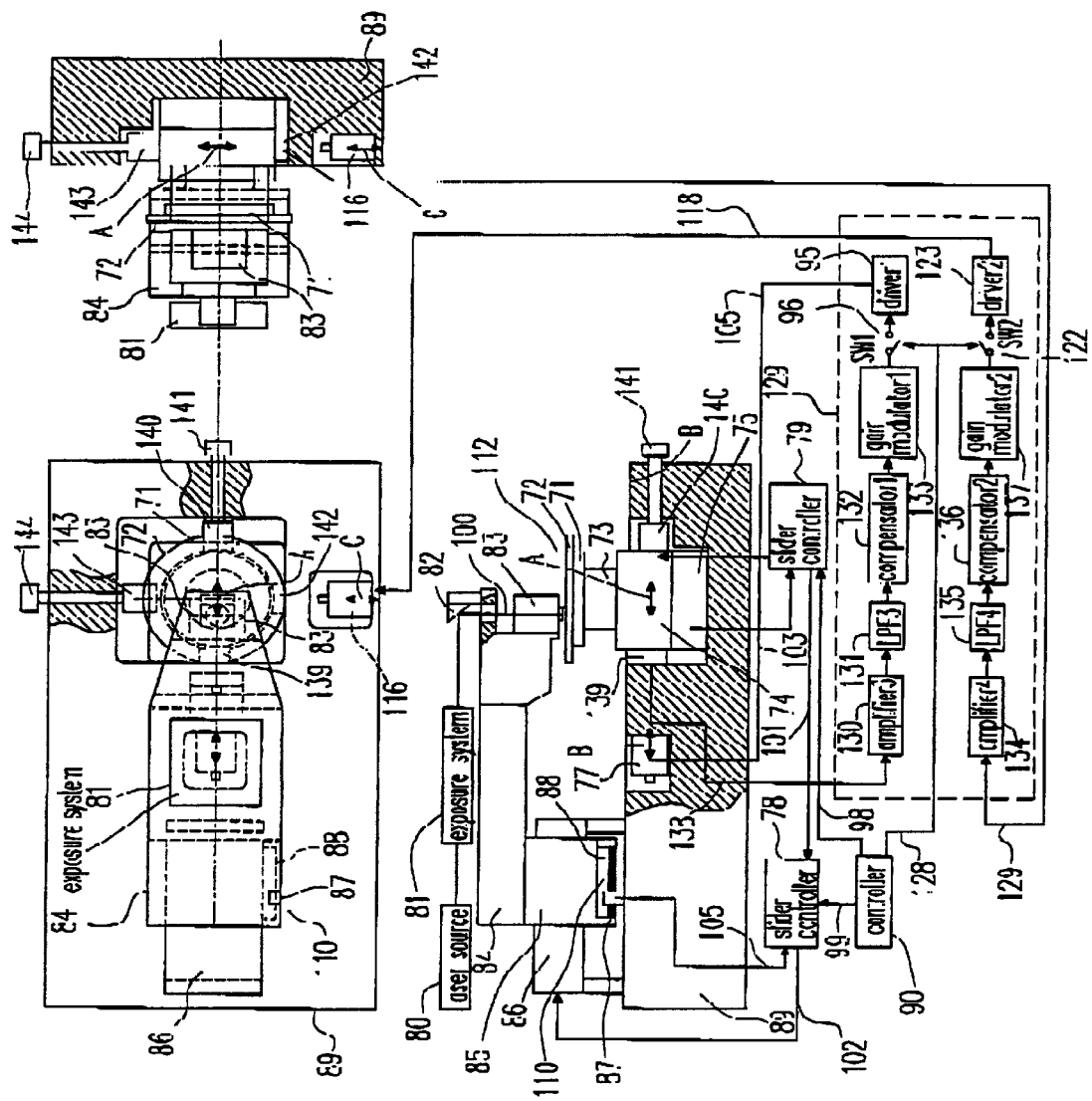
FIG. 8 shows a top view and a cross-sectional view from one side of the exposure apparatus according to the seventh embodiment of the invention.
Figure 9:
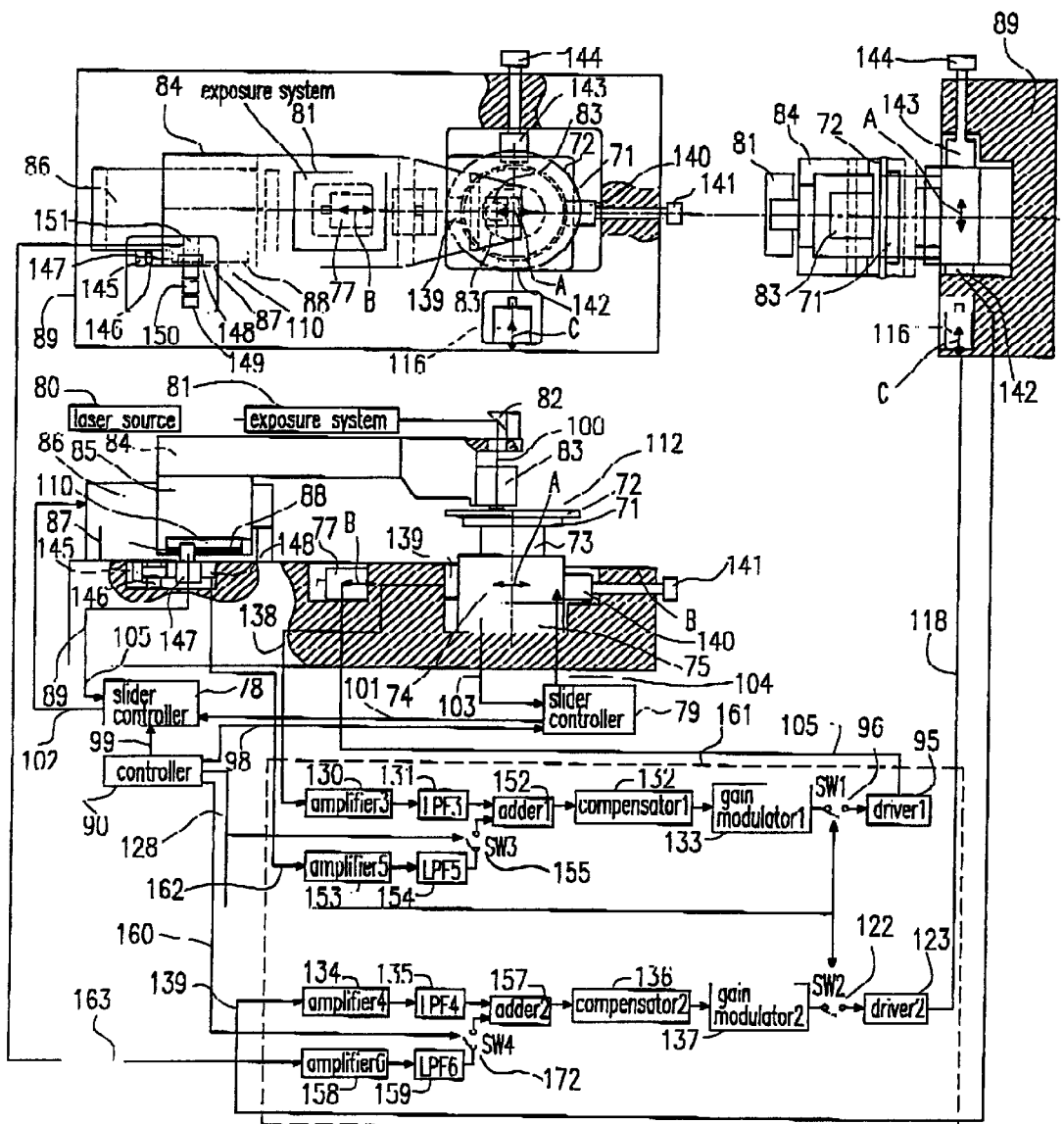
FIG. 9 shows a top view and a cross-sectional view from one side of the exposure apparatus according to the eighth embodiment of the invention.

Therefore, referring to FIG. 8, according to the seventh embodiment, it proposes a configuration that the action positions B and C of the vibration transporting forces and the action position A when the rotation mechanism 112 rotates are arranged in the same plane and line. This configuration is similar to the fifth embodiment. Because the two transporting forces can reduce the rotation momentum, and then even if the vibrators 77, 116 are not installed accurately, it can still reduce the influence of the transporting force that induces vibration in the yawing direction of the base 89.

Eighth Embodiment

FIG. 5 shows a configuration of the exposure apparatus according to the eighth embodiment according to the invention. The descriptions for the elements and operations same as the forth to the seventh embodiments are omitted. According to the eighth embodiment, the optical linear encoder consists of a scale 88 and a receiver 87 for detecting the position in the propagating direction. The receiver 87 of the optical linear encoder is fixed on an installing stage 147. A sixth and a seventh measurers 148, 151 for measuring transporting forces in the propagating direction and its perpendicular direction and a first and a second fixer 145, 149 for respectively applying a predetermined pressure to the sixth and the seventh measurers 148, 151 are installed on the installing stage 147. Through a first and a second fixing blocks 146, 150, the installing stage 147 is fixed to the base 89.

In addition, the rotation mechanism 112 is fixed to the recession of the base 89, similarly to the fifth embodiment. The output signals of the measurers 159, 142 for measuring the transporting forces in the propagating direction and its perpendicular direction of the rotation mechanism 112, and the output signals 162, 163 of the measurers 148, 151 for measuring transporting forces in the propagating direction and its perpendicular direction to the receiver 87 of the optical linear encoder are respectively inputted to amplifiers 130, 134, 153, 158. The output signals of the amplifiers 130, 134, 153, 158 are respectively inputted to the LPF3 131, LPF4 135, LPF5 154 and LPF6 159. The output signals of the LPF3 131 and LPF4 135 are respectively inputted to adder 152, 157 directly, and the output signals of the LPF4 135 are and LPF6 159 are respectively inputted to adder 152, 157 through switches SW3 155 and SW4 172. Similarly, as the fifth embodiment, the outputs of the adders 152, 157 are respectively inputted to compensators 132, 136. And the compensators 132, 136 are respectively connected to the vibrators 77, 116 through the gain modulators 133, 137, the switch SW1, SW2 and the drivers 95, 123. The servo control device 161 comprises the elements described above. Moreover, the ON/OFF signal for the SW3 155, 172 is connected to the controller 90.

The operation of the eighth embodiment is described below. First, before the operation is started, the ON signal is sent to the SW1 96 and the SW2 122 by the controller 90 such that the SW1 96 and the SW2 122 are on. Then the upper loop of the servo control device 161 begins to operate. Next, the ON signal is sent to the SW3 155 and the SW4 172 by the controller 90 such that the SW3 and the SW4 are on, and then both of the upper and lower loops of the servo control device 161 begin to operate. In the situation, it operates ω cancel the vibration in the propagating direction transported from outside.

As the rotation/propagation start command signal is sent by the controller 90 to activate the rotation operation, the transporting forces in the propagating direction and its perpendicular direction generated by the rotational vibration of the rotation mechanism can be cancelled, which is similar operation of the fifth embodiment. In addition, it also cancels the vibration phase due to that the base 89 is used as a transporting medium and the transporting forces in the propagating direction and its perpendicular direction acted on the optical linear encoder 110 with a large distortion (it usually results from the relative vibration between the rotation mechanism 112 and the slider 85).

According to the proposed configurations of the invention, the vibration in the propagating direction due to the rotational vibration of the invention, the vibration in the vibration in the propagating direction resulted from the external vibration, and the relative vibration between the rotation mechanism and the slider 85 can be entirely cancelled. It is possible to achieve a very high-precision propagation operation.

In regard to the first and the second vibrators 77, 116 used in the fourth to eighth embodiments, the mass of the moving part 169 and the mass of the optical disc 72 are the same. In addition, the transporting rate (a ratio of the vibration transporting force Pt and the force applied to the moving part P: Pt/P) is expressed by the following formula:

$$Ta=\{1+(2\cdot\zeta\cdot\omega/p)^2\}^{1/2}/[\{1-(\omega/p)^2\}^2+(2\cdot\zeta\cdot\omega/p)^2]^{1/2} \quad (8)$$

wherein $\zeta=C/2\cdot(m\cdot K)^{1/2}$, $\omega$ is the angular frequency used, $p=(K/m)^{1/2}=\omega c$ is the eigen angular frequency. If the resilient constant of the supporting spring is designed according to that the ratio of the angular frequency used $\omega$ and the eigen angular frequency $\omega c$ is in the vicinity of $\omega/\omega c=2^{1/2}$, the transporting rate due to the vibration of the moving part can be increased. Even though smaller vibrators are used, the vibration of the base 89 can still be cancelled.

In addition, the outputs of the measurers 148, 151 and the measurers 139, 142 for measuring the transporting force in the propagating direction forms a relative feedback system for converging the output of the measurers to zero. Therefore, it assures all the elements of the servo control device have linear characteristics and thus the control can be further enhanced.

In summary, according to the invention described above, an exposure apparatus for an optical disc is proposed. A laser beam emitted from a laser source passes through an exposure system and a condensing device, and then irradiates on the optical disc put on a rotation mechanism fixed on a base. When a pre-determined information is recorded on the optical disc, a base transporting force measuring device is used for measuring a transporting force in the propagating direction to the base that is involved a rotation of the rotation mechanism. By a controller, according to a result of the base transporting force measuring device, it controls the vibrator to vibrate, thereby the transporting force in the propagating direction acted on the base is cancelled. Therefore, it can suppress the propagating component of the rotational vibration when the optical disc is eccentrically chucked on the rotation mechanism. Thus, the propagation accuracy is increased and the exposure quality is enhanced.

According to the invention described above, an exposure apparatus for an optical disc is proposed. A laser beam emitted from a laser source passes through an exposure system and a condensing device, and than irradiates on the optical disc put on a rotation mechanism fixed on a base. When a pre-determined information is recorded on the optical disc, a linear encoder transporting force measuring device is used for measuring a transporting force in the propagating direction to the optical linear encoder that is involved a rotation of the rotation mechanism, wherein the optical linear encoder is used for detecting a propagation of the slider that is used for mounting the condensing device and moveably installed on the base. By a controller, according to a result of the linear encoder transporting force measuring device, it controls the vibrator to vibrate, thereby the transporting force in the propagating direction acted on the linear encoder is cancelled. Therefore, it can suppress the propagating component of the rotational vibration when the optical disc is eccentrically chucked on the rotation mechanism. Thus, the propagation accuracy is increased and the exposure quality is enhanced.

According to the invention described above, an exposure apparatus for an optical disc is proposed. A laser beam emitted from a laser source passes through an exposure system and a condensing device, and then irradiates on the optical disc put on a rotation mechanism fixed on a base. When a pre-determined information is recorded on the optical disc, a base transporting force measuring device is used for measuring a transporting force in the propagating direction to the base that is involved a rotation of the rotation mechanism, and furthermore, a linear encoder transporting force measuring device is used for measuring a transporting force in the propagating direction to the optical linear encoder that is involved a rotation of the rotation mechanism, wherein the optical linear encoder is used for detecting a propagation of the slider that is used for mounting the condensing device and moveably installed on the base. By a controller, according to the results of the base transporting force measuring device and the linear encoder transporting force measuring device, it controls the vibrator to vibrate, thereby the transporting forces in the propagating direction acted on the base and the optical linear encoder are cancelled. Therefore, it can suppress the propagating component of the rotational vibration when the optical disc is eccentrically chucked on the rotation mechanism. Besides, the vibrations in the propagating direction due to different propagating paths (relative vibration components having different phases), and the vibrations in the propagating direction from outside can be also suppressed. As a result, the propagation precision is increased and the exposure quality is enhanced.

As mentioned above, the controller performs a feedback control to make the vibrator to vibrate as the result of the base transporting force measuring device, the result of the linear encoder transporting force measuring device, or both the results of the base transporting force measuring device and the linear encoder transporting force measuring device converge to zero. Therefore, the assembly, adjustment and design of the control system for the exposure apparatus can be easier. Furthermore, the propagation accuracy is increased and the exposure quality is enhance with a low cost.

The vibrator mentioned above can be a voice coil actuator of a coil moving type or a magnetic moving type, and comprise a moving part, supported by a supporting spring having a pre-determined resilient constant, and a operation axis, fixes to the base at a right angle with respect to a surface of the base, wherein the resilient constant of the supporting spring is set in the vicinity of $\omega/\omega c=2^{1/2}$ in which $\omega$ is an angular frequency used and $\omega c$ is an eigen angular frequency of the vibrator. Therefore, the weight of the vibrator is reduced, and the assembly and adjustment for the exposure apparatus can be easier. Furthermore, the propagation accuracy is increased and the exposure quality is enhanced with a low cost.

In addition, the mass of the moving part of the vibrator and the mass of the optical disc put on the rotation mechanism are set the same. Therefore, the design of the control system for the exposure apparatus can be easier. Furthermore, the propagation accuracy is increased and the exposure quality is enhanced with a low cost.

According to the exposure apparatus of the invention, it comprises a first display for displaying a propagation deviation signal of the slider; a first measuring device for measuring a vibration amount of the base in a direction perpendicular to the propagating direction; a second display for displaying an output signal of the first measuring device; a second and a third measuring device for measuring rotation amounts of the propagating direction and its perpendicular direction of a rotation part of the rotation mechanism; a first control device for outputting a signal to eliminating a rotational vibration transporting force acted on the base according to frequencies and phases of output signals outputted from the second and the third measuring device; and a first and a second vibrators capable of freely vibrating in the propagating direction and its perpendicular direction according to the signal outputted from the first control device. The operator modulates the amplitude modulator of the first control device by referring to the first and the second displays, and therefore it can suppress the propagating component of the rotational vibration when the optical disc is eccentrically chucked on the rotation mechanism. Thus, the propagation accuracy is increased and the exposure quality is enhanced.

According to the exposure apparatus of the invention, it comprise a fourth and a fifth measuring devices, for measuring vibration transporting forces in a propagating direction and its perpendicular direction acted on the base when the rotation mechanism rotates; a first servo control device for outputting a signal to eliminating vibration transporting forces in the propagating direction and its perpendicular direction acted on the base according to output signals outputted from the fourth and the fifth measuring device; a first and a second vibrators capable of freely vibrating in the propagating direction and its perpendicular direction according to the signal outputted from the first servo control device. By using the servo control of the first servo control device without any operator, it can suppress the propagating component of the rotational vibration when the optical disc is eccentrically chucked on the rotation mechanism. Thus, the propagation accuracy is increased and the exposure quality is enhanced. Besides, because no particle are dropped due to the operator, the exposure quality is enhanced.

As described above, the action points of vibration transporting forces generated by the first and the second vibrators, and an action point of the vibration transporting force in the propagating direction acted on the base when the rotation mechanism rotates are all on a same plane, or the action points are on the same plane and line. By which, the installation and adjustment for the vibrators become easier, and the overall cost can be reduced.

According to the exposure apparatus of invention, it comprises a receiver of an optical linear encoder for detecting a propagation of the slider; a sixth and a seventh measuring devices, for measuring vibration transporting forces in a propagating direction and its perpendicular direction acted on the receiver of the optical linear encoder when the rotation mechanism rotates; a fourth and a fifth measuring devices, for measuring vibration transporting forces in the propagating direction and its perpendicular direction acted on the base when the rotation mechanism rotates; a second servo control device for output a signal to eliminating vibration transporting forces in the propagating direction and its perpendicular direction acted on the base and the optical linear encoder according to output signals outputted from the fourth, the fifth, the sixth and the seventh measuring devices; and a first and a second vibrators capable of freely vibrating in the propagating direction and its perpendicular direction according to the signal outputted from the second servo control device, wherein action points of vibration transporting forces generated by the first and the second vibrators, and an action point of the vibration transporting force in the propagating direction acted on the base when the rotation mechanism rotates are all on a same plane, or the action points are on the same plane and line. Therefore, it can suppress the propagating component of the rotational vibration when the optical disc is eccentrically chucked on the rotation mechanism. Besides, the vibrations in the propagating direction due to different propagating paths (relative vibration components having different phases), and the vibrations in the propagating direction from outside can be also suppressed. As a result, the propagation precision is increased and the exposure quality is enhanced.

Because a relative feedback system for converging the output of the measurers to zero is formed by the first and the second servo control devices for outputting signals to the first and the second vibrators for eliminating the vibration transporting force in the propagating direction acted on the base when the rotation mechanism rotates, therefore it assures all the elements of the servo control device have linear characteristics and thus the control can be further enhanced.

The first and the second vibrators are fixed on the base and capable of freely vibrating in the propagating direction and its perpendicular direction, and wherein the first and the second vibrators are voice coil actuators of a coil moving type or a magnetic moving type, and comprise a supporting spring having a resilient constant, in which the resilient constant of the supporting spring is set in the vicinity of $\omega/\omega c = ^{1/1}$ in which $\omega$ is an angular frequency used and $\omega c$ is an eigen angular frequency of the vibrator. Therefore, because the mechanism and the control system for implementing the invention become lightweight and simple, the vibration of the base can be well controlled, thereby the propagation is increased and the exposure quality is enhanced.

The first and the second vibrators are capable of freely vibrating in the propagating direction and its perpendicular direction, and wherein the first and the second vibrators are voice coil actuators of a coil moving type or a magnetic moving type, and masses of moving parts of the first and the second vibrators are respectively the same as a mass of the optical disc put on the rotation mechanism are the same. Therefore, because the mechanism and the control system for implementing the invention become lightweight and simple, the vibration of the base can be well controlled, thereby the propagation precision is increased and the exposure quality is enhanced. In addition, the cost of the apparatus can be significantly reduced.

While the present invention has been described with a preferred embodiment, this description is not intended to limit our invention. Various modifications of the embodiment will be apparent to those skilled in the art. It is therefore contemplated that the appended claims will cover any such modifications or embodiment as fall within the true scope of the invention.

What is claimed is:

1. An exposure apparatus for an optical disc, wherein a laser beam emitted from a laser source passes through an exposure system and a condensing device, and then irradiates on the optical disc put on a rotation mechanism fixed on a base, thereby, a pre-determined information is recorded on the optical disc, the exposure apparatus comprising:

a slider, for mounting the condensing device and moveably installed on the base;

a vibrator, installed on the base, and used for vibrating the condensing device along a propagating direction with respect to the base;

a base transporting force measuring device, for measuring a transporting force in the propagating direction to the base that is involved a rotation of the rotation mechanism; and a controller, for controlling the vibrator to vibrate according to a result of the base transporting force measuring device, thereby the transporting force in the propagating direction acted on the base is cancelled.

2. An exposure apparatus for an optical disc, wherein a laser beam emitted from a laser source passes through an exposure system and a condensing device, and then irradiates on the optical disc put on a rotation mechanism fixed on a base, thereby, a predetermined information is recorded on the optical disc, the exposure apparatus comprising:

a slider, for mounting the condensing device and moveably installed on the base;

an optical linear encoder, for detecting a propagation of the slider;

a vibrator, installed on the base, and used for vibrating the condensing device along a propagating direction with respect to the base;

a linear encoder transporting force measuring device, for measuring a transporting force in the propagating direction to the optical linear encoder that is involved a rotation of the rotation mechanism; and a controller, for controlling the vibrator to vibrate according to a result of the linear encoder transporting force measuring device, thereby the transporting force in the propagating direction acted on the optical linear encoder is cancelled.

3. An exposure apparatus for an optical disc, wherein a laser beam emitted from a laser source passes through an exposure system and a condensing device, and then irradiates on the optical disc put on a rotation mechanism fixed on a base, thereby, a predetermined information is recorded on the optical disc, the exposure apparatus comprising:

a slider, for mounting the condensing device and moveably installed on the base;

a vibrator, installed on the base, and used for vibrating the condensing device along a propagating direction with respect to the base;

a base transporting force measuring device, for measuring a transporting force in the propagating direction to the base that is involved a rotation of the rotation mechanism;

a linear encoder transporting force measuring device, for measuring a transporting force in the propagating direction to the optical linear encoder that is involved a rotation of the rotation mechanism; and a controller, for controlling the vibrator to vibrate according to results of the base transporting force measuring device and the linear encoder transporting force measuring device, thereby the transporting forces in the propagating direction acted on the base and the optical linear encoder are cancelled.

4. The exposure apparatus of claim 1, wherein the controller performs a feedback control to make the vibrator to vibrate as the result of the base transporting force measuring device, the result of a linear encoder transporting force measuring device, or both the results of the base transporting force measuring device and the linear encoder transporting force measuring device converge to zero.

5. The exposure apparatus of claim 4, wherein an action point of vibration transporting force generated by the vibrator, and an action point of the transporting force in the propagating direction to the base caused by the rotation of the rotation mechanism are on a same plane, or on the same plane and line.

6. The exposure apparatus of claim 4, wherein the vibrator is a voice coil actuator of a coil moving type or a magnetic moving type, and comprises a moving part, supported by a supporting spring having a pre-determined resilient constant, and a operation axis, fixed to the base at a right angle with respect to a surface of the base, wherein the resilient constant of the supporting spring is set in the vicinity of $\omega/\omega c=2^{1/2}$ in which $\omega$ is an angular frequency used and $\omega c$ is an eigen angular frequency of the vibrator.

7. The exposure apparatus of claim 6, wherein an action point of vibration transporting force generated by the vibrator, and an action point of the transporting force in the propagating direction to the base caused by the rotation of the rotation mechanism are on a same plane, or on the same plane and line.

8. The exposure apparatus of claim 6, wherein a mass of the moving part of the vibrator is the same as a mass of the optical disc put on the rotation mechanism.

9. The exposure apparatus of claim 8, wherein an action point of vibration transporting force generated by the vibrator, and an action point of the transporting force in the propagating direction to the base caused by the rotation of the rotation mechanism are on a same plane, or on the same plane and line.

10. An exposure apparatus for an optical disc, wherein the optical disc is irradiated by laser beams, thereby a predetermined information is recorded on the optical disc, the exposure apparatus comprising:

an exposure system;

a condensing device for condensing exposure beams directed by the exposure system;

a slider fixed on a base for mounting the condensing device and capable of moving along a radial direction of the optical disc;

a position detector for detecting the radial position of the slider;

a slider controller for controlling the slider according to an output of the position detector;

a rotation mechanism opposite to the condensing device and capable of freely rotating, and used for mounting the optic disc;

a first display for displaying a propagation deviation signal of the slider;

a first measuring device for measuring a vibration amount of the base in a direction perpendicular to the propagating direction;

a second display for displaying an output signal of the first measuring device;

a second and a third measuring device for measuring rotation amounts of the propagating direction and its perpendicular direction of a rotation part of the rotation mechanism;

a first control device for outputting a signal to eliminating a rotational vibration transporting force acted on the base according to frequencies and phases of output signals outputted from the second and the third measuring device; and a first and a second vibrators capable of freely vibrating in the propagating direction and its perpendicular direction according to the signal outputted from the first control device.

11. The exposure apparatus of claim 10, wherein action points of vibration transporting forces generated by the first and the second vibrators, and an action point of the vibration transporting force in the propagating direction acted on the base when the rotation mechanism rotates are all on a same plane, or the action points are on the same plane and line.

12. The exposure apparatus of claim 10, wherein a relative feedback system for converging the output of the measuring devices to zero is formed by the first and the second servo control devices for outputting signals to the first and the second vibrators for eliminating the vibration transporting force in the propagating direction acted on the base when the rotation mechanism rotates.

13. The exposure apparatus of claim 10, wherein the first and the second vibrators are fixed on the base and capable of freely vibrating in the propagating direction and its perpendicular direction, and wherein the first and the second vibrators are voice coil actuators of a coil moving type or a magnetic moving type, and comprise a supporting spring having a resilient constant, in which the resilient constant of the supporting spring is set in the vicinity of $\omega/\omega c = 2^{1/2}$ in which $\omega$ is an angular frequency used and $\omega c$ is an eigen angular frequency of the vibrator.

14. The exposure apparatus of claim 10, wherein the first and the second vibrators are capable of freely vibrating in the propagating direction and its perpendicular direction, and wherein the first and the second vibrators are voice coil actuators of a coil moving type or a magnetic moving type, and masses of moving parts of the first and the second vibrators are respectively the same as a mass of the optical disc put on the rotation mechanism are the same.

15. An exposure apparatus for an optical disc, wherein the optical disc is irradiated by laser beams, thereby a predetermined information is recorded on the optical disc, the exposure apparatus comprising:

an exposure system;

a condensing device for condensing exposure beams directed by the exposure system;

a slider fixed on a base for mounting the condensing device and capable of moving along a radial direction of the optical disc;

a position detector for detecting the radial position of the slider;

a slider controller for controlling the slider according to an output of the position detector;

a rotation mechanism opposite to the condensing device and capable of freely rotating, and used for mounting the optic disc;

a first and a second measuring devices, for measuring vibration transporting forces in a propagating direction and its perpendicular direction acted on the base when the rotation mechanism rotates;

a first servo control device for outputting a signal to eliminating vibration transporting forces in the propagating direction and its perpendicular direction acted on the base according to output signals outputted from the first and the second measuring device;

a first and a second vibrators capable of freely vibrating in the propagating direction and its perpendicular direction according to the signal outputted from the first servo control device.

16. The exposure apparatus of claim 15, wherein action points of vibration transporting forces generated by the first and the second vibrators, and an action point of the vibration transporting force in the propagating direction acted on the base when the rotation mechanism rotates are all on a same plane, or the action points are on the same plane and line.

17. The exposure apparatus of claim 15, wherein a relative feedback system for converging the output of the measuring devices to zero is formed by the first servo control device for outputting signals to the first and the second vibrators for eliminating the vibration transporting force in the propagating direction acted on the base when the rotation mechanism rotates.

18. The exposure apparatus of claim 15, wherein the first and the second vibrators are fixed on the base and capable of freely vibrating in the propagating direction and its perpendicular direction, and wherein the first and the second vibrators are voice coil actuators of a coil moving type or a magnetic moving type, and comprise a supporting spring having a resilient constant, in which the resilient constant of the supporting spring is set in the vicinity of $\omega/\omega c = 2^{1/2}$ in which $\omega$ is an angular frequency used and $\omega c$ is an eigen angular frequency of the vibrator.

19. The exposure apparatus of claim 15, wherein the first and the second vibrators are capable of freely vibrating in the propagating direction and its perpendicular direction, and wherein the first and the second vibrators are voice coil actuators of a coil moving type or a magnetic moving type, and masses of moving parts of the first and the second vibrators are respectively the same as a mass of the optical disc put on the rotation mechanism are the same.

20. An exposure apparatus for an optical disc, wherein the optical disc is irradiated by laser beams, thereby a predetermined information is recorded on the optical disc, the exposure apparatus comprising:

an exposure system;

a condensing device for condensing exposure beams directed by the exposure system;

a slider fixed on a base for mounting the condensing device and capable of moving along a radial direction of the optical disc;

a position detector for detecting the radial position of the slider;

a slider controller for controlling the slider according to an output of the position detector;

a rotation mechanism opposite to the condensing device and capable of freely rotating, and used for mounting the optic disc;

a receiver of an optical linear encoder for detecting a propagation of the slider;

a first and second measuring devices, for measuring vibration transporting forces in a propagating direction and its perpendicular direction acted on the receiver of the optical linear encoder when the rotation mechanism rotates;

a third and a forth measuring devices, for measuring vibration transporting forces in a propagating direction and its perpendicular direction acted on the base when the rotation mechanism rotates;

a first servo control device for outputting a signal to eliminating vibration transporting forces in the propagating direction and its perpendicular direction acted on the base and the optical linear encoder according to output signals outputted from the first the second, the third and the forth measuring devices; and a first and a second vibrators capable of freely vibrating in the propagating direction and its perpendicular direction according to the signal outputted from the first servo control device, wherein action points of vibration transporting forces generated by the first and the second vibrators, and an action point of the vibration transporting force in the propagating direction acted on the base when the rotation mechanism rotates are all on a same plane, or the action points are on the plane and line.

21. The exposure apparatus of claim 20, wherein a relative feedback system for converging the output of the measuring devices to zero is formed by the first servo control device for outputting signals to the first and the second vibrators for eliminating the vibration transporting force in the propagating direction acted on the base when the rotation mechanism rotates.

22. The exposure apparatus of claim 20, wherein the first and the second vibrators are fixed on the base and capable of freely vibrating in the propagating direction and its perpendicular direction, and wherein the first and the second vibrators are voice coil actuators of a coil moving type or a magnetic moving type, and comprise a supporting spring having a resilient constant, in which the resilient constant of the supporting spring is set in the vicinity of $\omega/\omega c = 2^{1/2}$ in which $\omega$ is an angular frequency used and $\omega c$ is an eigen angular frequency of the vibrator.

23. The exposure apparatus of claim 20, wherein the first and the second vibrators are capable of freely vibrating in the propagating direction and its perpendicular direction, and wherein the first and the second vibrators are voice coil actuators of a coil moving type or a magnetic moving type, and masses of moving parts of the first and the second vibrators are respectively the same as a mass of the optical disc put on the rotation mechanism are the same.

24. The exposure apparatus of claim 1, wherein an action point of vibration transporting force generated by the vibrator, and an action point of the transporting force in the propagating direction to the base caused by the rotation of the rotation mechanism are on a same plane, or on the same plane and line.

* * * * *